(12) United States Patent
Sato

(10) Patent No.: US 9,284,438 B2
(45) Date of Patent: Mar. 15, 2016

(54) RUBBER COMPOSITION AND PNEUMATIC TIRE

(75) Inventor: Daisuke Sato, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 14/361,206

(22) PCT Filed: Jun. 26, 2012

(86) PCT No.: PCT/JP2012/066204
§ 371 (c)(1),
(2), (4) Date: May 28, 2014

(87) PCT Pub. No.: WO2013/099324
PCT Pub. Date: Jul. 4, 2013

(65) Prior Publication Data
US 2014/0329930 A1 Nov. 6, 2014

(30) Foreign Application Priority Data
Dec. 26, 2011 (JP) .................. 2011-284032

(51) Int. Cl.
*C08K 3/36* (2006.01)
*B60C 1/00* (2006.01)
*C08L 9/06* (2006.01)
*C08L 15/00* (2006.01)
*C08C 19/44* (2006.01)

(52) U.S. Cl.
CPC ... *C08L 9/06* (2013.01); *B60C 1/00* (2013.01); *C08C 19/44* (2013.01); *C08K 3/36* (2013.01); *C08L 15/00* (2013.01); *C08L 2205/025* (2013.01); *C08L 2205/03* (2013.01); *C08L 2205/035* (2013.01); *C08L 2666/08* (2013.01); *Y02T 10/862* (2013.01)

(58) Field of Classification Search
CPC .................................. C08K 3/36; C09L 9/06
USPC .............................. 524/492, 493, 526
See application file for complete search history.

(56) References Cited

U.S. PATENT DOCUMENTS

| | | | |
|---|---|---|---|
| 4,929,679 A | 5/1990 | Akita et al. | |
| 4,945,964 A * | 8/1990 | Takiguchi et al. | 152/209.5 |
| 5,189,109 A | 2/1993 | Imai et al. | |
| 5,574,109 A | 11/1996 | Lawson et al. | |
| 5,679,744 A | 10/1997 | Kawauzra et al. | |
| 5,834,552 A | 11/1998 | Kawazura et al. | |
| 5,902,856 A | 5/1999 | Suzuki et al. | |
| 5,932,662 A | 8/1999 | Lawson et al. | |
| 5,932,866 A | 8/1999 | Terada et al. | |
| 7,084,228 B2 | 8/2006 | Labauze et al. | |
| 7,351,761 B2 * | 4/2008 | Hochi | 524/442 |
| 2004/0152845 A1 | 8/2004 | Oshima et al. | |
| 2005/0209413 A1 | 9/2005 | Labauze et al. | |
| 2006/0173118 A1 | 8/2006 | Hochi et al. | |
| 2007/0149688 A1 | 6/2007 | Hochi | |
| 2008/0289740 A1 | 11/2008 | Mori et al. | |
| 2009/0247696 A1 | 10/2009 | Fujii et al. | |
| 2010/0048806 A1 | 2/2010 | Inagaki et al. | |
| 2010/0056703 A1 | 3/2010 | Oshima | |
| 2010/0056709 A1 | 3/2010 | Oshima | |
| 2010/0056710 A1 | 3/2010 | Oshima | |
| 2010/0056712 A1 | 3/2010 | Oshima | |
| 2010/0056713 A1 | 3/2010 | Oshima | |
| 2010/0144954 A1 | 6/2010 | Kikuchi et al. | |
| 2010/0184908 A1 | 7/2010 | Kikuchi et al. | |
| 2011/0166254 A1 | 7/2011 | Nishimura | |
| 2011/0237737 A1 | 9/2011 | Fujii et al. | |
| 2011/0245398 A1 | 10/2011 | Hama et al. | |
| 2012/0190771 A1 | 7/2012 | Ito et al. | |
| 2012/0283354 A1 | 11/2012 | Hattori et al. | |

(Continued)

FOREIGN PATENT DOCUMENTS

| | | |
|---|---|---|
| CN | 1134434 A | 10/1996 |
| CN | 1148606 A | 4/1997 |
| CN | 1386786 A | 12/2002 |
| CN | 1530379 A | 9/2004 |
| CN | 1821293 A | 8/2006 |
| CN | 1990532 A | 7/2007 |
| CN | 101113217 A | 1/2008 |
| CN | 101659729 A | 3/2010 |
| CN | 101659731 A | 3/2010 |
| CN | 101671418 A | 3/2010 |
| CN | 102093602 A | 6/2011 |
| CN | 102093605 A | 6/2011 |
| CN | 102108141 A | 6/2011 |
| CN | 102603975 A | 7/2012 |
| CN | 103003346 A | 3/2013 |

(Continued)

OTHER PUBLICATIONS

International Search Report, issued in PCT/JP2012/066204, dated Sep. 18, 2012.

(Continued)

*Primary Examiner* — Vickey Nerangis
(74) *Attorney, Agent, or Firm* — Birch, Stewart, Kolasch & Birch, LLP

(57) ABSTRACT

Provided are a rubber composition achieving balanced improvements in fuel economy, wet-grip performance, abrasion resistance, and handling stability, and a pneumatic tire including the composition. The rubber composition includes a rubber component including at least 95% by mass of conjugated diene polymers having a Tg of −75-0° C. and a Mw of $1.5 \times 10^5$-$1.5 \times 10^6$, the rubber component (100% by mass) including 5-65% by mass of SBR (A) having a styrene content of at least 5% by mass but less than 15% by mass and a vinyl bond content of 10-70 mol %, and 20-75% by mass of SBR (B) having a styrene content of at least 15% by mass but less than 30% by mass and a vinyl bond content of 10-70 mol %, the composition including, per 100 parts by mass of the rubber component, 1-30 parts by mass of a low-molecular-weight conjugated diene polymer having a Tg of −75-0° C. and a Mw of at least $1.0 \times 10^3$ but less than $1.5 \times 10^5$, and 10-150 parts by mass of silica having a $N_2SA$ of 40-400 $m^2/g$, the composition having a tan δ peak temperature of at least −20° C.

10 Claims, No Drawings

(56) References Cited

U.S. PATENT DOCUMENTS

| | | |
|---|---|---|
| 2013/0085225 A1 | 4/2013 | Nishioka et al. |
| 2014/0114014 A1 | 4/2014 | Tokimune et al. |
| 2014/0213693 A1 | 7/2014 | Mabuchi et al. |
| 2014/0213714 A1 | 7/2014 | Ono et al. |
| 2014/0228501 A1 | 8/2014 | Ono et al. |
| 2014/0256847 A1 | 9/2014 | Sato et al. |
| 2014/0275430 A1 | 9/2014 | Ishino et al. |
| 2014/0296376 A1 | 10/2014 | Sato et al. |
| 2014/0329930 A1 | 11/2014 | Sato |
| 2014/0329931 A1 | 11/2014 | Sato |

FOREIGN PATENT DOCUMENTS

| | | |
|---|---|---|
| EP | 0 585 012 A1 | 3/1994 |
| EP | 0 881 101 A1 | 12/1998 |
| EP | 1 484 362 A1 | 12/2004 |
| EP | 1 803 770 A2 | 7/2007 |
| EP | 1 925 636 A1 | 5/2008 |
| EP | 2 196 324 A1 | 6/2010 |
| EP | 2 223 959 A1 | 9/2010 |
| EP | 2 236 554 A1 | 10/2010 |
| EP | 2 329 964 A1 | 6/2011 |
| EP | 2 338 698 A1 | 6/2011 |
| EP | 2 338 919 A1 | 6/2011 |
| EP | 2 366 557 A1 | 9/2011 |
| EP | 2 366 558 A1 | 9/2011 |
| EP | 2 404 944 A1 | 1/2012 |
| JP | 48-17674 B1 | 5/1973 |
| JP | 56-131640 A | 10/1981 |
| JP | 63-099249 A | 4/1988 |
| JP | 63-99252 A | 4/1988 |
| JP | 8-193147 A | 7/1996 |
| JP | 8-231766 A | 9/1996 |
| JP | 8-253520 A | 10/1996 |
| JP | 2000-239444 A | 9/2000 |
| JP | 2000-344955 A | 12/2000 |
| JP | 2001-151940 A | 6/2001 |
| JP | 2004-137463 A | 5/2004 |
| JP | 2004-277696 A | 10/2004 |
| JP | 2004-331940 A | 11/2004 |
| JP | 2006-182940 A | 7/2006 |
| JP | 2006/233177 A | 9/2006 |
| JP | 2006-257260 A | 9/2006 |
| JP | 2007-197671 A | 8/2007 |
| JP | 2008-101158 A | 5/2008 |
| JP | 2009-1721 A | 1/2009 |
| JP | 2009-35643 A | 2/2009 |
| JP | 2010-77412 A | 4/2010 |
| JP | 2010-77413 A | 4/2010 |
| JP | 2010-77414 A | 4/2010 |
| JP | 2010-254852 A | 11/2010 |
| JP | 2011-79913 A | 4/2011 |
| JP | 2011-144324 A | 7/2011 |
| JP | 2012-167257 A | 9/2012 |
| WO | WO 2009/048006 A1 | 4/2009 |
| WO | WO 2010/116988 A1 | 10/2010 |
| WO | WO 2011/087004 A1 | 7/2011 |
| WO | WO 2012/011571 A1 | 1/2012 |

OTHER PUBLICATIONS

English Machine Translation for JP-2000-239444-A dated Sep. 5, 2000.
English Machine Translation for JP-2001-151940-A dated Jun. 5, 2001.
English Machine Translation for JP-2008-101158-A dated May 1, 2008.
English Machine Translation for JP-2009-1721-A dated Jan. 8, 2009.
English Machine Translation for JP-2011-79913-A dated Apr. 21, 2011.
International Preliminary Report on Patentability and English Translation of the Written Opinion of the International Searching Authority (Forms PCT/IB373 and PCT/ISA/237), dated Jul. 1, 2014, for International Application No. PCT/JP2012/066204.

\* cited by examiner

RUBBER COMPOSITION AND PNEUMATIC TIRE

TECHNICAL FIELD

The present invention relates to a rubber composition and a pneumatic tire formed from the rubber composition.

BACKGROUND ART

With the recent increase in concern about environmental issues, the demand on automobiles for better fuel economy is increasing. Better fuel economy is also being required of rubber compositions used for automotive tires. For example, rubber compositions containing a conjugated diene polymer (e.g. polybutadiene, butadiene-styrene copolymer) and a filler (e.g. carbon black, silica) are used for automotive tires.

The addition of a polymer having a low glass transition temperature, such as polybutadiene rubber, is known as a technique for improving fuel economy. The addition of polybutadiene rubber improves fuel economy but tends to deteriorate wet-grip performance. On the other hand, no addition of polybutadiene rubber tends to deteriorate abrasion resistance. Thus, methods for achieving a balanced improvement in fuel economy, wet-grip performance, and abrasion resistance are demanded.

Moreover, automotive tires need to have handling stability to ensure safety. Thus, improvements in handling stability as well as fuel economy, wet-grip performance, and abrasion resistance are demanded.

Patent Literature 1 proposes a method of improving fuel economy by using a diene rubber (modified rubber) that is modified by an organosilicon compound containing an amino group and an alkoxy group. Unfortunately, this method still has room for improvement in terms of achieving a balanced improvement in fuel economy, wet-grip performance, abrasion resistance, and handling stability.

CITATION LIST

Patent Literature

Patent Literature 1: JP 2000-344955 A

SUMMARY OF INVENTION

Technical Problem

An object of the present invention is to solve the problems identified above by providing a rubber composition capable of achieving a balanced improvement in fuel economy, wet-grip performance, abrasion resistance, and handling stability, and by providing a pneumatic tire including the rubber composition.

Solution to Problem

The present invention relates to a rubber composition, including, based on 100% by mass of a rubber component, not less than 95% by mass of conjugated diene polymers having a glass transition temperature of −75 to 0° C. and a weight average molecular weight (Mw) of $1.5 \times 10^5$ to $1.5 \times 10^6$, the rubber component including, based on 100% by mass of the rubber component: 5 to 65% by mass of styrene butadiene rubber (A) having a styrene content of at least 5% by mass but less than 15% by mass and a vinyl bond content in a 1,3-butadiene moiety of 10 to 70 mol %, and 20 to 75% by mass of styrene butadiene rubber (B) having a styrene content of at least 15% by mass but less than 30% by mass and a vinyl bond content in a 1,3-butadiene moiety of 10 to 70 mol %, the rubber composition including, for each 100 parts by mass of the rubber component: 1 to 30 parts by mass of a low molecular weight conjugated diene polymer having a glass transition temperature of −75 to 0° C. and a weight average molecular weight (Mw) of at least $1.0 \times 10^3$ but less than $1.5 \times 10^5$; and 10 to 150 parts by mass of a silica having a nitrogen adsorption specific surface area of 40 to 400 m²/g, the rubber composition having a tan δ peak temperature of not lower than −20° C.

The low molecular weight conjugated diene polymer preferably has a weight average molecular weight (Mw) of $1.0 \times 10^3$ to $5.0 \times 10^3$.

Preferably, the rubber composition includes, based on 100% by mass of the rubber component, 5 to 50% by mass of styrene butadiene rubber (C) having a styrene content of at least 30% by mass but less than 45% by mass and a vinyl bond content in a 1,3-butadiene moiety of 10 to 70 mol %.

Preferably, at least one of the styrene butadiene rubbers (A), (B), and (C) is obtained by polymerizing a monomer component including styrene, 1,3-butadiene, and a silicon-containing vinyl compound in the presence of a polymerization initiator represented by the following formula (I):

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom; and M represents an alkali metal atom, to produce a copolymer, and then reacting a compound containing at least one of a nitrogen atom and a silicon atom with an active terminal of the copolymer.

Preferably, the styrene butadiene rubber (A) is obtained by polymerizing a monomer component including styrene, 1,3-butadiene, and a silicon-containing vinyl compound in the presence of a polymerization initiator represented by the formula (I) to produce a copolymer, and then reacting a compound containing at least one of a nitrogen atom and a silicon atom with an active terminal of the copolymer.

$R^{11}$ in the formula (I) is preferably a group represented by the following formula (Ia):

wherein $R^{14}$ represents a hydrocarbylene group including at least one of a structural unit derived from a conjugated diene compound and a structural unit derived from an aromatic vinyl compound; and n represents an integer of 1 to 10.

$R^{14}$ in the formula (Ia) is preferably a hydrocarbylene group including from one to ten isoprene-derived structural unit(s).

The silicon-containing vinyl compound is preferably a compound represented by the following formula (II):

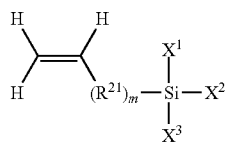
(II)

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

Preferably, the low molecular weight conjugated diene polymer is a copolymer of styrene and 1,3-butadiene, and has a vinyl bond content in a 1,3-butadiene moiety of 20 to 70 mol %.

Preferably, the low molecular weight conjugated diene polymer is a copolymer of styrene and 1,3-butadiene, and has a styrene content of 10 to 45% by mass.

The present invention also relates to a pneumatic tire, formed from the rubber composition.

Advantageous Effects of Invention

According to the present invention, a rubber composition includes specific amounts of specific styrene butadiene rubbers, a specific low molecular weight conjugated diene polymer, and a specific silica. Thus, the rubber composition enables to provide a pneumatic tire capable of achieving a balanced improvement in fuel economy, wet-grip performance, abrasion resistance, and handling stability.

DESCRIPTION OF EMBODIMENTS

The rubber composition of the present invention includes, based on 100% by mass of a rubber component, not less than 95% by mass of conjugated diene polymers having a glass transition temperature of −75 to 0° C. and a weight average molecular weight (Mw) of $1.5 \times 10^5$ to $1.5 \times 10^6$, the rubber component including, based on 100% by mass of the rubber component: 5 to 65% by mass of styrene butadiene rubber (A) (hereinafter, also referred to as SBR (A)) having a styrene content of at least 5% by mass but less than 15% by mass and a vinyl bond content in a 1,3-butadiene moiety of 10 to 70 mol %; and 20 to 75% by mass of styrene butadiene rubber (B) (hereinafter, also referred to as SBR (B)) having a styrene content of at least 15% by mass but less than 30% by mass and a vinyl bond content in a 1,3-butadiene moiety of 10 to 70 mol %, the rubber composition including, for each 100 parts by mass of the rubber component, 1 to 30 parts by mass of a low molecular weight conjugated diene polymer having a glass transition temperature of −75 to 0° C. and a weight average molecular weight (Mw) of at least $1.0 \times 10^3$ but less than $1.5 \times 10^5$, and 10 to 150 parts by mass of a silica having a nitrogen adsorption specific surface area of 40 to 400 m$^2$/g, the rubber composition having a tan δ peak temperature of not lower than −20° C. By combining SBRs (A) and (B), a low molecular weight conjugated diene polymer, and a silica, and adjusting the tan δ peak temperature within a specific range as mentioned above, it is possible to improve wet-grip performance, abrasion resistance, and handling stability while maintaining fuel economy, and therefore to achieve balanced improvements in these properties at high levels. Moreover, the rubber composition of the present invention is excellent in processability, rubber strength, and the temperature dependence of wet-grip performance.

Conjugated diene polymers having a glass transition temperature (Tg) of −75 to 0° C. and a weight average molecular weight (Mw) of $1.5 \times 10^5$ to $1.5 \times 10^6$ are used as the rubber component of the rubber composition of the present invention. The conjugated diene polymers may be any conjugated diene polymers whose Tg and weight average molecular weight (Mw) values fall within the respective aforementioned ranges. The SBR (A) and SBR (B) can be suitably used as the conjugated diene polymers.

The amount of the conjugated diene polymers based on 100% by mass of the rubber component is not less than 95% by mass, preferably not less than 98% by mass, more preferably not less than 99% by mass, and particularly preferably 100% by mass. If the amount is less than 95% by mass, a balanced improvement in fuel economy, wet-grip performance, abrasion resistance, and handling stability may not be achieved.

The conjugated diene polymers have a Tg of not lower than −75° C., preferably not lower than −65° C. With a Tg lower than −75° C., wet-grip performance tends to be reduced. Also, the conjugated diene polymer preferably has a Tg of not higher than 0° C., more preferably not higher than −10° C. With a Tg higher than 0° C., the compatibility with the SBRs (A) and (B) tends to deteriorate and thus fuel economy or abrasion resistance tends to deteriorate.

The Tg values (midpoint glass transition temperatures) are determined by a method described in examples.

The conjugated diene polymers have a weight average molecular weight (Mw) of not less than $1.5 \times 10^5$, preferably not less than $2.5 \times 10^5$. The conjugated diene polymers having a Mw less than $1.5 \times 10^5$ may fail to sufficiently ensure fuel economy and abrasion resistance. Also, the conjugated diene polymers have a Mw of not more than $1.5 \times 10^6$, preferably not more than $5.0 \times 10^3$. If the Mw is more than $1.5 \times 10^6$, kneading processability may significantly deteriorate so that productivity can be greatly decreased.

The Mw can be determined by a method described in examples.

SBR (A) has a styrene content of not less than 5% by mass, preferably not less than 10% by mass. If the styrene content is less than 5% by mass, the effect of styrene groups tends not to be easily exerted and thus wet-grip performance tends to decrease. SBR (A) has a styrene content of less than 15% by mass. If the styrene content is not less than 15% by mass, the improving effect of the combined use with SBR (B) is not achieved.

The styrene content can be determined by a method described in examples.

SBR (B) has a styrene content of not less than 15% by mass, preferably not less than 20% by mass. If the styrene content is less than 15% by mass, the improving effect of the combined use with SBR (A) is not achieved. SBR (B) has a styrene content of less than 30% by mass. If the styrene content is not less than 30% by mass, the compatibility with the copolymer (A) may deteriorate so that abrasion resistance can be deteriorated.

If the difference in styrene content between SBR (A) and SBR (B) is small, the effect of the combined use of these SBRs tends to decrease so that wet-grip performance can be more temperature-dependent. Thus, the difference in styrene content between SBR (A) and SBR (B) is preferably not less than 7% by mass, and more preferably not less than 10% by mass.

The rubber component of the rubber composition of the present invention preferably includes styrene butadiene rubber (C) (hereinafter, also referred to as SBR (C)) having a styrene content of at least 30% by mass but less than 45% by mass and a vinyl bond content in a 1,3-butadiene moiety of 10 to 70 mol %, in addition to SBR (A) and SBR (B). This further improves the temperature dependence of wet-grip performance so that excellent wet-grip performance can be achieved in a wide temperature range.

SBR (C) has a styrene content of not less than 30% by mass, preferably not less than 35% by mass. If the styrene content is less than 30% by mass, the improving effect of the combined use with SBR (B) is not achieved. SBR (C) has a styrene content of less than 45% by mass. If the styrene content is not less than 45% by mass, the compatibility with SBR (A) and SBR (B) may deteriorate and thus fuel economy may deteriorate.

SBRs (A), (B), and (C) each have a vinyl bond content in a 1,3-butadiene moiety of not less than 10 mol %, preferably not less than 20 mol %. If the vinyl bond content is less than 10 mol %, then the SBRs (A), (B), and (C) tend to be less reactive with a silane coupling agent and thus fuel economy or abrasion resistance tends to deteriorate. The vinyl bond content is not more than 70 mol %, preferably not more than 60 mol %. If the vinyl bond content is more than 70 mol %, the resulting final rubber composition tends to have an excessively high glass transition temperature and thus fuel economy tends to deteriorate.

The vinyl bond content can be determined by a method described in examples.

The amount of SBR (A) based on 100% by mass of the rubber component is not less than 5% by mass, preferably not less than 10% by mass. If the amount is less than 5% by mass, the improving effect of SBR (A) tends not to be sufficiently achieved. The amount is not more than 65% by mass, preferably not more than 60% by mass. If the amount is more than 65% by mass, the amount of SBR (B) becomes small and thus the temperature dependence of wet-grip performance tends to increase.

The amount of SBR (B) based on 100% by mass of the rubber component is not less than 20% by mass, preferably not less than 30% by mass. If the amount is less than 20% by mass, the improving effect of SBR (B) tends not to be sufficiently achieved. The amount is not more than 75% by mass, preferably not more than 70% by mass. If the amount is more than 75% by mass, the amount of SBR (A) becomes small and thus the temperature dependence of wet-grip performance tends to increase.

The amount of SBR (C) based on 100% by mass of the rubber component is preferably not less than 5% by mass, and more preferably not less than 10% by mass. If the amount is less than 5% by mass, the improving effect of SBR (C) tends not to be sufficiently achieved. The amount is preferably not more than 50% by mass, and more preferably not more than 45% by mass. If the amount is more than 50% by mass, the amounts of SBR (A) and SBR (B) become small and thus the temperature dependence of wet-grip performance tends to increase.

The combined amount of SBRs (A), (B), and (C) based on 100% by mass of the rubber component is preferably not less than 70% by mass, more preferably not less than 80% by mass, still more preferably not less than 90% by mass, and particularly preferably not less than 95% by mass, and may be 100% by mass. If the combined amount is less than 70% by mass, wet-grip performance tends not to be sufficiently improved. Also, in general, if the combined amount of SBRs (A), (B), and (C) is more than 90% by mass, processability tends to deteriorate; however, since the rubber composition of the present invention contains a low molecular weight conjugated diene polymer, good processability can be ensured even when the combined amount is more than 90% by mass.

SBRs (A), (B), and (C) each preferably have a molecular weight distribution of 1 to 5, more preferably 1 to 2, in order to enhance fuel economy.

The molecular weight distribution can be determined by measuring a number average molecular weight (Mn) and a weight average molecular weight (Mw) using gel permeation chromatography (GPC), and dividing Mw by Mn.

At least one of SBRs (A), (B), and (C) is preferably terminally modified by a compound containing a nitrogen atom and/or a silicon atom because this allows silica to disperse well, thereby enhancing the effects of improving the properties. More preferably, at least one of SBRs (A), (B), and (C) is an SBR (hereinafter, also referred to as modified SBR) obtained by polymerizing a monomer component including styrene, 1,3-butadiene, and a silicon-containing vinyl compound in the presence of a polymerization initiator represented by the following formula (I):

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom; and M represents an alkali metal atom, to produce a copolymer, and then reacting a compound containing a nitrogen atom and/or a silicon atom with an active terminal of the copolymer. In terms of greatly improving fuel economy and abrasion resistance, SBR (A) is preferably a modified SBR.

As used herein, a hydrocarbyl group denotes a monovalent group provided by removing one hydrogen atom from a hydrocarbon; a hydrocarbylene group denotes a divalent group provided by removing two hydrogen atoms from a hydrocarbon; a hydrocarbyloxy group denotes a monovalent group provided by replacing the hydrogen atom of a hydroxy group with a hydrocarbyl group; a substituted amino group denotes a group provided by replacing at least one hydrogen atom of an amino group with a monovalent atom other than a hydrogen atom or with a monovalent group, or denotes a group provided by replacing the two hydrogen atoms of an amino group with a divalent group; a hydrocarbyl group having a substituent (hereinafter, also referred to as substituted hydrocarbyl group) denotes a monovalent group provided by replacing at least one hydrogen atom of a hydrocarbyl group with a substituent; and a hydrocarbylene group containing a hetero atom (hereinafter, also referred to as hetero atom-containing hydrocarbylene group) denotes a divalent group provided by replacing a hydrogen atom and/or a carbon atom other than the carbon atoms from which a hydrogen atom has been removed, in a hydrocarbylene group with a group containing a hetero atom (an atom other than carbon and hydrogen atoms).

As used herein, the term "modifying" means that a copolymer derived from a diene compound alone or with an aromatic vinyl compound is bonded to a compound other than the compounds. The above modified SBR has a structure in which the polymerization initiation terminal is modified by a polymerization initiator represented by the formula (I); the main chain is modified by copolymerization with a silicon-containing vinyl compound; and the termination terminal is modified by a compound containing a nitrogen atom and/or a silicon atom a silicon-containing vinyl compound. This structure enables to disperse silica well and achieve a balanced improvement in fuel economy, rubber strength, wet-grip performance, and handling stability. In general, the use of a modified rubber in which all of the initiation terminal, main chain and termination terminal are modified tends to greatly deteriorate processability. In contrast, the use of the modified copolymer in which the initiation terminal, main chain and termination terminal are modified by the respective specific compounds ensures good processability and, at the same time, makes it possible to synergistically enhance the effects of improving fuel economy, rubber strength, wet-grip performance, and handling stability.

In the formula (I), i represents 0 or 1, preferably 1.

$R^{11}$ in the formula (I) represents a $C_{1\text{-}100}$ hydrocarbylene group, preferably a $C_{6\text{-}100}$ hydrocarbylene group, and more preferably a $C_{7\text{-}80}$ hydrocarbylene group. If $R^{11}$ has more than 100 carbon atoms, the polymerization initiator has an increased molecular weight, which may reduce cost efficiency and the workability during polymerization.

Plural kinds of compounds differing in the carbon number of $R^{11}$ may be used in combination as the polymerization initiator represented by the formula (I).

$R^{11}$ in the formula (I) is preferably a group represented by the following formula (Ia):

wherein $R^{14}$ represents a hydrocarbylene group including a structural unit derived from a conjugated diene compound and/or a structural unit derived from an aromatic vinyl compound; and n represents an integer of 1 to 10.

$R^{14}$ in the formula (Ia) represents a hydrocarbylene group including a structural unit derived from a conjugated diene compound and/or a structural unit derived from an aromatic vinyl compound, preferably a hydrocarbylene group including an isoprene-derived structural unit, and more preferably a hydrocarbylene group including from one to ten isoprene-derived structural unit(s).

The number of the structural unit derived from a conjugated diene compound and/or the structural unit derived from an aromatic vinyl compound in $R^{14}$ preferably ranges from one to ten, more preferably from one to five.

In the formula (Ia), n represents an integer of 1 to 10, preferably an integer of 2 to 4.

Examples of $R^{11}$ include a group obtained by bonding from one to ten isoprene-derived structural unit(s) and a methylene group; a group obtained by bonding from one to ten isoprene-derived structural unit(s) and an ethylene group; and a group obtained by bonding from one to ten isoprene-derived structural unit(s) and a trimethylene group, preferably a group obtained by bonding from one to ten isoprene-derived structural unit(s) and a trimethylene group.

In the formula (I), $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom.

The optionally substituted hydrocarbyl group refers to a hydrocarbyl group or substituted hydrocarbyl group. The substituent in the substituted hydrocarbyl group may be a substituted amino group or a hydrocarbyloxy group. Examples of the hydrocarbyl groups include acyclic alkyl groups such as a methyl group, an ethyl group, an n-propyl group, an isopropyl group, an n-butyl group, an isobutyl group, a sec-butyl group, a tert-butyl group, an n-pentyl group, an n-hexyl group, an n-octyl group, and an n-dodecyl group; cyclic alkyl groups such as a cyclopentyl group and a cyclohexyl group; and aryl groups such as a phenyl group and a benzyl group, preferably acyclic alkyl groups, and more preferably $C_{1\text{-}4}$ acyclic alkyl groups. Examples of the substituted hydrocarbyl groups in which the substituent is a substituted amino group include an N,N-dimethylaminomethyl group, a 2-N,N-dimethylaminoethyl group, and a 3-N,N-dimethylaminopropyl group. Examples of the substituted hydrocarbyl groups in which the substituent is a hydrocarbyloxy group include a methoxymethyl group, a methoxyethyl group, and an ethoxymethyl group. Preferred among the above examples are hydrocarbyl groups, more preferably $C_{1\text{-}4}$ acyclic alkyl groups, and still more preferably a methyl group or an ethyl group.

Examples of the trihydrocarbylsilyl groups include a trimethylsilyl group and a tert-butyl-dimethylsilyl group. A trimethylsilyl group is preferred.

The hydrocarbylene group optionally containing at least one, as a hetero atom, selected from the group consisting of a silicon atom, a nitrogen atom, and an oxygen atom refers to a hydrocarbylene group, or a hetero atom-containing hydrocarbylene group in which the hetero atom is at least one selected from the group consisting of a silicon atom, a nitrogen atom and an oxygen atom. Examples of the hetero atom-containing hydrocarbylene groups in which the hetero atom is at least one selected from the group consisting of a silicon atom, a nitrogen atom and an oxygen atom include hetero atom-containing hydrocarbylene groups in which the hetero atom is a silicon atom, hetero atom-containing hydrocarbylene groups in which the hetero atom is a nitrogen atom, and hetero atom-containing hydrocarbylene groups in which the hetero atom is an oxygen atom. Examples of the hydrocarbylene groups include alkylene groups such as a tetramethylene group, a pentamethylene group, a hexamethylene group, a pent-2-ene-1,5-diyl group, and a 2,2,4-trimethylhexane-1,6-diyl group; and alkenediyl groups such as a pent-2-ene-1,5-diyl group, preferably alkylene groups, and more preferably $C_{4\text{-}7}$ alkylene groups. Examples of the hetero atom-containing hydrocarbylene groups in which the hetero atom is a silicon atom include a group represented by —Si(CH$_3$)$_2$—CH$_2$—CH$_2$—Si(CH$_3$)$_2$—. Examples of the hetero atom-containing hydrocarbylene groups in which the hetero atom is a nitrogen atom include a group represented by —CH=N—CH=CH— and a group represented by —CH=N—CH$_2$—CH$_2$—. Examples of the hetero atom-containing hydrocarbylene groups in which the hetero atom is an oxygen atom include a group represented by —CH$_2$—CH$_2$—O—CH$_2$—CH$_2$—. Preferred among the above examples are hydrocarbylene groups, more preferably $C_{4\text{-}7}$ alkylene groups, and still more preferably a tetramethylene group, a pentamethylene group, or a hexamethylene group.

Preferably, each of $R^{12}$ and $R^{13}$ is a hydrocarbyl group, or $R^{12}$ and $R^{13}$ are bonded to each other to form a hydrocarbylene group. More preferably, each of $R^{12}$ and $R^{13}$ is a $C_{1\text{-}4}$ acyclic alkyl group, or $R^{12}$ and $R^{13}$ are bonded to each other to form a $C_{4-7}$ alkylene group. Still more preferably, each of $R^{12}$ and $R^{13}$ is a methyl group or an ethyl group.

M in the formula (I) represents an alkali metal atom. Examples of the alkali metal atoms include Li, Na, K, and Cs, preferably Li.

The polymerization initiator represented by the formula (I) in which i is 1 may be a compound formed from one to five isoprene-derived structural unit(s) polymerized with an aminoalkyllithium compound. Examples of the aminoalkyllithium compounds include N,N-dialkylaminoalkyllithiums such as 3-(N,N-dimethylamino)-1-propyllithium, 3-(N,N-diethylamino)-1-propyllithium, 3-(N,N-di-n-butylamino)-1-propyllithium, 4-(N,N-dimethylamino)-1-butyllithium, 4-(N,N-diethylamino)-1-butyllithium, 4-(N,N-di-n-propylamino)-1-butyllithium, and 3-(N,N-di-n-butylamino)-1-butyllithium; hetero atom-free cyclic aminoalkyllithium compounds such as 3-(1-pyrrolidino)-1-propyllithium, 3-(1-piperidino)-1-propyllithium, 3-(1-hexamethyleneimino)-1-propyllithium, and 3-[1-(1,2,3,6-tetrahydropyridino)]-1-propyllithium; and hetero atom-containing cyclic aminoalkyllithium compounds such as 3-(1-morpholino)-1-propyllithium, 3-(1-imidazolyl)-1-propyllithium, 3-(4,5-dihydro-1-imidazolyl)-1-propyllithium, and 3-(2,2,5,5-tetramethyl-1-aza-2,5-disila-1-cyclopentyl)-1-propyllithium, preferably N,N-dialkylaminoalkyllithiums, and more preferably 3-(N,N-dimethylamino)-1-propyllithium or 3-(N,N-diethylamino)-1-propyllithium.

Examples of the polymerization initiators represented by the formula (I) in which i is 0 include lithium hexamethyleneimide, lithium pyrrolidide, lithium piperidide, lithium heptamethyleneimide, lithium dodecamethyleneimide, lithium dimethylamide, lithium diethylamide, lithium dipropylamide, lithium dibutylamide, lithium dihexylamide, lithium diheptylamide, lithium dioctylamide, lithium di-2-ethylhexylamide, lithium didecylamide, lithium-N-methylpiperadide, lithium ethylpropylamide, lithium ethylbutylamide, lithium methylbutylamide, lithium ethylbenzylamide, and lithium methylphenethylamide.

The polymerization initiator represented by the formula (I) in which i is 0 may be prepared in advance from a secondary amine and a hydrocarbyllithium compound before it is used in the polymerization reaction, or may be formed in the polymerization system. Examples of the secondary amines include dimethylamine, diethylamine, dibutylamine, dioctylamine, dicyclohexylamine, and diisobutylamine. Other examples thereof include cyclic amines such as azacycloheptane (i.e. hexamethyleneimine), 2-(2-ethylhexyl)pyrrolidine, 3-(2-propyl)pyrrolidine, 3,5-bis(2-ethylhexyl)piperidine, 4-phenylpiperidine, 7-decyl-1-azacyclotridecane, 3,3-dimethyl-1-azacyclotetradecane, 4-dodecyl-1-azacyclooctane, 4-(2-phenylbutyl)-1-azacyclooctane, 3-ethyl-5-cyclohexyl-1-azacycloheptane, 4-hexyl-1-azacycloheptane, 9-isoamyl-1-azacycloheptadecane, 2-methyl-1-azacycloheptadec-9-ene, 3-isobutyl-1-azacyclododecane, 2-methyl-7-t-butyl-1-azacyclododecane, 5-nonyl-1-azacyclododecane, 8-(4-methylphenyl)-5-pentyl-3-azabicyclo[5.4.0]undecane, 1-butyl-6-azabicyclo[3.2.1]octane, 8-ethyl-3-azabicyclo[3.2.1]octane, 1-propyl-3-azabicyclo[3.2.2]nonane, 3-(t-butyl)-7-azabicyclo[4.3.0]nonane, and 1,5,5-trimethyl-3-azabicyclo[4.4.0]decane.

The polymerization initiator represented by the formula (I) is preferably a compound in which i is 1, more preferably a compound formed from one to five isoprene-derived structural unit(s) polymerized with an N,N-aminoalkyllithium, and still more preferably a compound formed from one to five isoprene-derived structural unit(s) polymerized with 3-(N,N-dimethylamino)-1-propyllithium or 3-(N,N-diethylamino)-1-propyllithium.

The amount of the polymerization initiator represented by the formula (I) to be used is preferably 0.01 to 15 mmol, and more preferably 0.1 to 10 mmol, for each 100 g of the monomer component used in the polymerization.

In the present invention, other polymerization initiators, such as n-butyllithium, may be used in combination, if necessary.

Examples of the conjugated diene compounds include 1,3-butadiene, isoprene, 1,3-pentadiene, 2,3-dimethyl-1,3-butadiene, 1,3-hexadiene, and myrcene. These may be used alone, or two or more of these may be used in combination. In view of easy availability, the conjugated diene compound is preferably 1,3-butadiene or isoprene.

The silicon-containing vinyl compound is preferably a compound represented by the following formula (II):

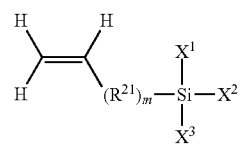

(II)

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

In the formula (II), m represents 0 or 1, preferably 0.

The hydrocarbylene group in the formula (II) may be an alkylene group, an alkenediyl group, an arylene group, or a group in which an arylene group and an alkylene group are bonded. Examples of the alkylene groups include a methylene group, an ethylene group, and a trimethylene group. Examples of the alkenediyl groups include a vinylene group and an ethylene-1,1-diyl group. Examples of the arylene groups include a phenylene group, a naphthylene group, and a biphenylene group. Examples of the groups in which an arylene group and an alkylene group are bonded include a group in which a phenylene group and a methylene group are bonded, and a group in which a phenylene group and an ethylene group are bonded.

$R^{21}$ is preferably an arylene group, and more preferably a phenylene group.

In the formula (II), $X^1$, $X^2$ and $X^3$ each represent a substituted amino group, a hydrocarbyloxy group, or an optionally substituted hydrocarbyl group. Preferably, at least one of $X^1$, $X^2$ and $X^3$ is a substituted amino group. More preferably, two of $X^1$, $X^2$ and $X^3$ are substituted amino groups.

In the formula (II), the substituted amino group is preferably a group represented by the following formula (IIa):

(IIa)

wherein $R^{22}$ and $R^{23}$ each represent an optionally substituted hydrocarbyl group or a trihydrocarbylsilyl group, or $R^{22}$ and $R^{23}$ are bonded to each other to form a hydrocarbylene group optionally containing a nitrogen atom and/or an oxygen atom as a hetero atom.

The optionally substituted hydrocarbyl group in the formula (IIa) refers to a hydrocarbyl group or a substituted hydrocarbyl group. The substituted hydrocarbyl group may be a substituted hydrocarbyl group in which the substituent is a hydrocarbyloxy group. Examples of the hydrocarbyl groups include acyclic alkyl groups such as a methyl group, an ethyl group, an n-propyl group, an isopropyl group, an n-butyl group, an isobutyl group, a sec-butyl group, a tert-butyl group, an n-pentyl group, an n-hexyl group, and an n-octyl group; cyclic alkyl groups such as a cyclopentyl group and a cyclohexyl group; and aryl groups such as a phenyl group, a benzyl group, and a naphthyl group, preferably acyclic alkyl groups, and more preferably a methyl group or an ethyl group. Examples of the substituted hydrocarbyl groups in which the substituent is a hydrocarbyloxy group include alkoxyalkyl groups such as a methoxymethyl group, an ethoxymethyl group, and a methoxyethyl group; and aryloxyalkyl groups such as a phenoxymethyl group.

Examples of the trihydrocarbylsilyl group in the formula (IIa) include trialkylsilyl groups such as a trimethylsilyl group, a triethylsilyl group, and a tert-butyldimethylsilyl group.

The hydrocarbylene group optionally containing a nitrogen atom and/or an oxygen atom as a hetero atom in the formula (IIa) refers to a hydrocarbylene group, or a hetero atom-containing hydrocarbylene group in which the hetero atom is a nitrogen atom and/or an oxygen atom. The hetero atom-containing hydrocarbylene group in which the hetero atom is a nitrogen atom and/or an oxygen atom may be a hetero atom-containing hydrocarbylene group in which the hetero atom is a nitrogen atom, or a hetero atom-containing hydrocarbylene group in which the hetero atom is an oxygen atom. Examples of the hydrocarbylene groups include alkylene groups such as a trimethylene group, a tetramethylene group, a pentamethylene group, a hexamethylene group, a heptamethylene group, an octamethylene group, a decamethylene group, a dodecamethylene group, and a 2,2,4-trimethylhexane-1,6-diyl group; and alkenediyl groups such as a pent-2-ene-1,5-diyl group. Examples of the hetero atom-containing hydrocarbylene groups in which the hetero atom is a nitrogen atom include a group represented by —CH=N—CH=CH— and a group represented by —CH=N—CH$_2$—CH$_2$—. Examples of the hetero atom-containing hydrocarbylene groups in which the hetero atom is an oxygen atom include a group represented by —CH$_2$—CH$_2$—O—CH$_2$—CH$_2$—.

Preferably, each of $R^{22}$ and $R^{23}$ is an alkyl group, or $R^{22}$ and $R^{23}$ are bonded to each other to form an alkylene group. Each of $R^{22}$ and $R^{23}$ is more preferably an alkyl group, and still more preferably a methyl group or an ethyl group.

Examples of the substituted amino groups represented by the formula (IIa) in which $R^{22}$ and $R^{23}$ are hydrocarbyl groups include dialkylamino groups such as a dimethylamino group, a diethylamino group, an ethylmethylamino group, a di-n-propylamino group, a diisopropylamino group, a di-n-butylamino group, a diisobutylamino group, a di-sec-butylamino group, and a di-tert-butylamino group; and diarylamino groups such as a diphenylamino group, preferably dialkylamino groups, and more preferably a dimethylamino group, a diethylamino group, or a di-n-butylamino group. Examples of the substituted amino groups in which $R^{22}$ and $R^{23}$ are substituted hydrocarbyl groups in which the substituent is a hydrocarbyloxy group include di(alkoxyalkyl)amino groups such as a di(methoxymethyl)amino group and a di(ethoxymethyl)amino group. Examples of the substituted amino groups in which $R^{22}$ or $R^{23}$ is a trihydrocarbylsilyl group include trialkylsilyl group-containing amino groups such as a bis(trimethylsilyl)amino group, a bis(tert-butyldimethylsilyl)amino group, and an N-trimethylsilyl-N-methylamino group.

Examples of the substituted amino groups represented by the formula (IIa) in which $R^{22}$ and $R^{23}$ are bonded to each other to form a hydrocarbylene group include 1-alkyleneimino groups such as a 1-trimethyleneimino group, a 1-pyrrolidino group, a 1-piperidino group, a 1-hexamethyleneimino group, a 1-heptamethyleneimino group, a 1-octamethyleneimino group, a 1-decamethyleneimino group, and a 1-dodecamethyleneimino group. Examples of the substituted amino groups in which $R^{22}$ and $R^{23}$ are bonded to each other to form a hydrocarbylene group containing a nitrogen atom as a hetero atom include a 1-imidazolyl group and a 4,5-dihydro-1-imidazolyl group. Examples of the substituted amino groups in which $R^{22}$ and $R^{23}$ are bonded to each other to form a hydrocarbylene group containing an oxygen atom as a hetero atom include a morpholino group.

The substituted amino group represented by the formula (IIa) is preferably a dialkylamino group or a 1-alkyleneimino group, more preferably a dialkylamino group, and still more preferably a dimethylamino group, a diethylamino group, or a di-n-butylamino group.

Examples of the hydrocarbyloxy group in the formula (II) include alkoxy groups such as a methoxy group, an ethoxy group, an n-propoxy group, an isopropoxy group, an n-butoxy group, a sec-butoxy group, and a tert-butoxy group; and aryloxy groups such as a phenoxy group and a benzyloxy group.

The optionally substituted hydrocarbyl group in the formula (II) refers to a hydrocarbyl group or a substituted hydrocarbyl group. The substituted hydrocarbyl group may be a substituted hydrocarbyl group in which the substituent is a hydrocarbyloxy group. Examples of the hydrocarbyl groups include alkyl groups such as a methyl group, an ethyl group, an n-propyl group, an isopropyl group, an n-butyl group, a sec-butyl group, and a tert-butyl group; and aryl groups such as a phenyl group, a 4-methyl-1-phenyl group, and a benzyl group. Examples of the substituted hydrocarbyl groups in which the substituent is a hydrocarbyloxy group include alkoxyalkyl groups such as a methoxymethyl group, an ethoxymethyl group, and an ethoxyethyl group.

Examples of the silicon-containing vinyl compounds represented by the formula (II) in which one of $X^1$, $X^2$, and $X^3$ is a substituted amino group, and m is 0 include: (dialkylamino)dialkylvinylsilanes such as (dimethylamino)dimethylvinylsilane, (ethylmethylamino)dimethylvinylsilane, (di-n-propylamino)dimethylvinylsilane, (diisopropylamino)dimethylvinylsilane, (dimethylamino)diethylvinylsilane, (ethylmethylamino)diethylvinylsilane, (di-n-propylamino)diethylvinylsilane, and (diisopropylamino)diethylvinylsilane; [bis(trialkylsilyl)amino]dialkylvinylsilanes such as [bis(trimethylsilyl)amino]dimethylvinylsilane, [bis(t-butyldimethylsilyl)amino]dimethylvinylsilane, [bis(trimethylsilyl)amino]diethylvinylsilane, and [bis(t-butyldimethylsilyl)amino]diethylvinylsilane; (dialkylamino)di(alkoxyalkyl)vinylsilanes such as (dimethylamino)di(methoxymethyl)vinylsilane, (dimethylamino)di(methoxyethyl)vinylsilane, (dimethylamino)di(ethoxymethyl)vinylsilane, (dimethylamino)di(ethoxyethyl)vinylsilane, (diethylamino)di(methoxymethyl)vinylsilane, (diethylamino)di(methoxyethyl)vinylsilane, (diethylamino)di(ethoxymethyl)vinylsilane, and (diethylamino)di(ethoxyethyl)vinylsilane; and cyclic aminodialkylvinylsilane compounds such as pyrrolidinodimethylvinylsilane, piperidinodimethylvinylsilane, hexamethyleneiminodimethylvinylsilane, 4,5-dihydro-imidazolyldimethylvinylsilane, and morpholinodimethylvinylsilane.

Examples of the silicon-containing vinyl compounds represented by the formula (II) in which one of $X^1$, $X^2$, and $X^3$ is a substituted amino group, and m is 1 include (dialkylamino)dialkylvinylphenylsilanes such as (dimethylamino)dimethyl-4-vinylphenylsilane, (dimethylamino)dimethyl-3-vinylphenylsilane, (diethylamino)dimethyl-4-vinylphenylsilane, (diethylamino)dimethyl-3-vinylphenylsilane, (di-n-propylamino)dimethyl-4-vinylphenylsilane, (di-n-propylamino)dimethyl-3-vinylphenylsilane, (di-n-butylamino)dimethyl-4-vinylphenylsilane, (di-n-butylamino)dimethyl-3-vinylphenylsilane, (dimethylamino)diethyl-4-vinylphenylsilane, (dimethylamino)diethyl-3-vinylphenylsilane, (diethylamino)diethyl-4-vinylphenylsilane, (diethylamino)diethyl-3-vinylphenylsilane, (di-n-propylamino)diethyl-4-vinylphenylsilane, (di-n-propylamino)diethyl-3-vinylphenylsilane, (di-n-butylamino)diethyl-4-vinylphenylsilane, and (di-n-butylamino)diethyl-3-vinylphenylsilane.

Examples of the silicon-containing vinyl compounds represented by the formula (II) in which two of $X^1$, $X^2$, and $X^3$ are substituted amino groups, and m is 0 include: bis(dialkylamino)alkylvinylsilanes such as bis(dimethylamino)methylvinylsilane, bis(diethylamino)methylvinylsilane, bis(di-n-propylamino)methylvinylsilane, bis(di-n-butylamino)methylvinylsilane, bis(dimethylamino)ethylvinylsilane, bis(diethylamino)ethylvinylsilane, bis(di-n-propylamino)ethylvinylsilane, and bis(di-n-butylamino)ethylvinylsilane; bis[bis(trialkylsilyl)amino]alkylvinylsilanes such as bis[bis(trimethylsilyl)amino]methylvinylsilane, bis[bis(tert-butyldimethylsilyl)amino]methylvinylsilane, bis[bis(trimethylsilyl)amino]ethylvinylsilane, and bis[bis(tert-butyldimethylsilyl)amino]ethylvinylsilane; bis(dialkylamino)alkoxyalkylsilanes such as bis(dimethylamino)methoxymethylvinylsilane, bis(dimethylamino)methoxyethylvinylsilane, bis(dimethylamino)ethoxymethylvinylsilane, bis(dimethylamino)ethoxyethylvinylsilane, bis(diethylamino)methoxymethylvinylsilane, bis(diethylamino)methoxyethylvinylsilane, bis(diethylamino)ethoxymethylvinylsilane, and bis(dimethylamino)ethoxyethylvinylsilane; and bis(cyclic amino)alkylvinylsilane compounds such as bis(pyrrolidino)methylvinylsilane, bis(piperidino)methylvinylsilane, bis(hexamethyleneimino)methylvinylsilane, bis(4,5-dihydroimidazolyl)methylvinylsilane, and bis(morpholino)methylvinylsilane.

Examples of the silicon-containing vinyl compounds represented by the formula (II) in which two of $X^1$, $X^2$, and $X^3$ are substituted amino groups, and m is 1 include bis(dialkylamino)alkylvinylphenylsilanes such as bis(dimethylamino)methyl-4-vinylphenylsilane, bis(dimethylamino)methyl-3-vinylphenylsilane, bis(diethylamino)methyl-4-vinylphenylsilane, bis(diethylamino)methyl-3-vinylphenylsilane, bis(di-n-propylamino)methyl-4-vinylphenylsilane, bis(di-n-propylamino)methyl-3-vinylphenylsilane, bis(di-n-butylamino)methyl-4-vinylphenylsilane, bis(di-n-butylamino)methyl-3-vinylphenylsilane, bis(dimethylamino)ethyl-4-vinylphenylsilane, bis(dimethylamino)ethyl-3-vinylphenylsilane, bis(diethylamino)ethyl-4-vinylphenylsilane, bis(diethylamino)ethyl-3-vinylphenylsilane, bis(di-n-propylamino)ethyl-4-vinylphenylsilane, bis(di-n-propylamino)ethyl-3-vinylphenylsilane, bis(di-n-butylamino)ethyl-4-vinylphenylsilane, and bis(di-n-butylamino)ethyl-3-vinylphenylsilane.

Examples of the silicon-containing vinyl compounds represented by the formula (II) in which the three of $X'$, $X^2$, and $X^3$ are substituted amino groups, and m is 0 include tris(dialkylamino)vinylsilanes such as tris(dimethylamino)vinylsilane, tris(diethylamino)vinylsilane, tris(di-n-propylamino)vinylsilane, and tris(di-n-butylamino)vinylsilane.

Examples of the silicon-containing vinyl compounds represented by the formula (II) in which the three of $X'$, $X^2$, and $X^3$ are substituted amino groups, and m is 1 include tris(dialkylamino)vinylphenylsilanes such as tris(dimethylamino)-4-vinylphenylsilane, tris(dimethylamino)-3-vinylphenylsilane, tris(diethylamino)-4-vinylphenylsilane, tris(diethylamino)-3-vinylphenylsilane, tris(di-n-propylamino)-4-vinylphenylsilane, tris(di-n-propylamino)-3-vinylphenylsilane, tris(di-n-butylamino)-4-vinylphenylsilane, and tris(di-n-butylamino)-3-vinylphenylsilane.

Examples of the silicon-containing vinyl compounds represented by the formula (II) in which each of $X^1$, $X^2$, and $X^3$ is not a substituted amino group, and m is 0 include: trialkoxyvinylsilanes such as trimethoxyvinylsilane, triethoxyvinylsilane, and tripropoxyvinylsilane; dialkoxyalkylvinylsilanes such as methyldimethoxyvinylsilane and methyldiethoxyvinylsilane; dialkoxyarylvinylsilanes such as di(tert-pentoxy)phenylvinylsilane and di(tert-monoalkoxydialkylvinylsilanes such as dimethylmethoxyvinylsilane; monoalkoxydiarylvinylsilanes such as tert-butoxydiphenylvinylsilane and tert-pentoxydiphenylvinylsilane; monoalkoxyalkylarylvinylsilanes such as tert-butoxymethylphenylvinylsilane and tert-butoxyethylphenylvinylsilane; and substituted alkoxyvinylsilane compounds such as tris(β-methoxyethoxy)vinylsilane.

Other examples of the silicon-containing vinyl compounds include bis(trialkylsilyl)aminostyrenes such as 4-N,N-bis(trimethylsilyl)aminostyrene and 3-N,N-bis(trimethylsilyl)aminostyrene; and bis(trialkylsilyl)aminoalkylstyrenes such as 4-bis(trimethylsilyl)aminomethylstyrene, 3-bis(trimethylsilyl)aminomethylstyrene, 4-bis(trimethylsilyl)aminoethylstyrene, and 3-bis(trimethylsilyl)aminoethylstyrene.

The silicon-containing vinyl compound is preferably a compound represented by the formula (II), more preferably a compound represented by the formula (II) in which m is 0, and still more preferably a compound represented by the formula (II) in which two of $X^1$, $X^2$ and $X^3$ are dialkylamino groups.

The silicon-containing vinyl compound is particularly preferably bis(dimethylamino)methylvinylsilane, bis(diethylamino)methylvinylsilane, or bis(di-n-butylamino)methylvinylsilane.

The amount of the silicon-containing vinyl compound used in the production of the modified SBR, when expressed based on 100% by mass of the total amount of the monomer component used in the polymerization, is preferably not less than 0.01% by mass, more preferably not less than 0.02% by mass, and still more preferably not less than 0.05% by mass, in terms of achieving a balanced enhancement in processability, fuel economy, rubber strength, wet-grip performance, and handling stability. The amount is preferably not more than 20% by mass, more preferably not more than 2% by mass, and still more preferably not more than 1% by mass, in terms of increasing cost efficiency and rubber strength.

In the production of the modified SBR, the monomer component may further include polymerizable monomers in addition to the styrene, 1,3-butadiene, and silicon-containing vinyl compound. Examples of such monomers include vinyl nitriles and unsaturated carboxylic acid esters. Examples of the vinyl nitriles include acrylonitrile. Examples of the unsaturated carboxylic acid esters include methyl acrylate, ethyl acrylate, methyl methacrylate, and ethyl methacrylate.

In the production of the modified SBR, polymerization is preferably performed in a hydrocarbon solvent. The hydrocarbon solvent does not inactivate the polymerization initiator represented by the formula (I). Examples of the hydrocarbon solvents include aliphatic hydrocarbons, aromatic hydrocarbons, and alicyclic hydrocarbons. Examples of the aliphatic hydrocarbons include propane, n-butane, iso-butane, n-pentane, iso-pentane, n-hexane, n-heptane, and n-octane. Examples of the aromatic hydrocarbons include benzene, toluene, xylene, and ethylbenzene. Examples of the alicyclic hydrocarbons include cyclopentane and cyclohexane. The hydrocarbon solvent may be a mixture of different components, such as industrial hexane. It is preferably a $C_{2-12}$ hydrocarbon.

The polymerization reaction may be performed in the presence of an agent for adjusting the vinyl bond content of 1,3-butadiene units, or an agent for adjusting the distributions of a 1,3-butadiene unit and a monomer unit derived from a monomer other than 1,3-butadiene in the modified SBR chains (hereinafter, referred to collectively as "adjusting agents"). Examples of these agents include ether compounds, tertiary amine compounds, and phosphine compounds. Examples of the ether compounds include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Examples of the tertiary amine compounds include triethylamine, tripropylamine, tributylamine, N,N,N',N'-tetramethylethylenediamine, N,N-diethylaniline, pyridine, and quinoline. Examples of the phosphine compounds include trimethylphosphine, triethylphosphine, and triphenylphosphine. One or more of them may be used.

In the production of the modified SBR, the polymerization initiator may be supplied to a polymerization reactor before the monomer component is supplied to the polymerization reactor; or the polymerization initiator may be supplied to a polymerization reactor after the whole amount of the monomer component used in the polymerization is supplied to the polymerization reactor; or the polymerization initiator may be supplied to a polymerization reactor after a part of the monomer component used in the polymerization is supplied to the polymerization reactor. Moreover, the polymerization initiator may be supplied at once or continuously to the polymerization reactor.

In the production of the modified SBR, the monomer component may be supplied at once, continuously, or intermittently to the polymerization reactor. Moreover, monomers may be supplied individually or simultaneously to the polymerization reactor.

In the production of the modified SBR, the polymerization temperature is usually 25 to 100° C., preferably 35 to 90° C., and more preferably 50 to 80° C. The polymerization time usually ranges from 10 minutes to 5 hours.

The modified SBR is obtained by polymerizing a monomer component including styrene, 1,3-butadiene, and a silicon-containing vinyl compound in the presence of a polymerization initiator represented by the formula (I) to produce a copolymer, and then reacting a compound containing a nitrogen atom and/or a silicon atom with an active terminal of the copolymer (the active terminal of the copolymer is considered to contain an alkali metal derived from the polymerization initiator) (terminal modification reaction). More specifically, it is obtained by adding a compound containing a nitrogen atom and/or a silicon atom to the polymerization solution and then mixing them. The amount of the compound containing a nitrogen atom and/or a silicon atom to be added to the polymerization solution is usually 0.1 to 3 mol, preferably 0.5 to 2 mol, and more preferably 0.7 to 1.5 mol, per mol of the alkali metal derived from the polymerization initiator represented by the formula (I) to be used.

The terminal modification reaction is usually performed at a temperature of 25 to 100° C., preferably 35 to 90° C., and more preferably 50 to 80° C. The time period for the reaction is usually 60 seconds to 5 hours, preferably 5 minutes to 1 hour, and more preferably 15 minutes to 1 hour.

Preferred examples of the compound containing a nitrogen atom and/or a silicon atom include compounds containing a nitrogen atom and a carbonyl group.

The compound containing a nitrogen atom and a carbonyl group is preferably a compound represented by the following formula (III):

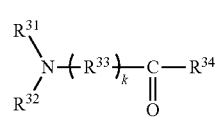

(III)

wherein $R^{31}$ represents an optionally substituted hydrocarbyl group, or is joined to $R^{32}$ to form a hydrocarbylene group optionally containing a nitrogen atom and/or an oxygen atom as a hetero atom, or is joined to $R^{34}$ to form a divalent group; $R^{32}$ represents an optionally substituted hydrocarbyl group, or is joined to $R^{31}$ to form a hydrocarbylene group optionally containing a nitrogen atom and/or an oxygen atom as a hetero atom; and $R^{34}$ represents an optionally substituted hydrocarbyl group or a hydrogen atom, or is joined to $R^{31}$ to form a divalent group; $R^{33}$ represents a divalent group; and k represents 0 or 1.

In the formula (III), the optionally substituted hydrocarbyl group for $R^{31}$, $R^{32}$ or $R^{34}$ refers to a hydrocarbyl group or a substituted hydrocarbyl group. The substituted hydrocarbyl group may be a substituted hydrocarbyl group in which the substituent is a hydrocarbyloxy group, or a substituted hydrocarbyl group in which the substituent is a substituted amino group. Examples of the hydrocarbyl groups include alkyl groups such as a methyl group, an ethyl group, an n-propyl group, an isopropyl group, and an n-butyl group; alkenyl groups such as a vinyl group, an allyl group, and an isopropenyl group; and aryl groups such as a phenyl group. Examples of the substituted hydrocarbyl groups in which the substituent is a hydrocarbyloxy group include alkoxyalkyl groups such as a methoxymethyl group, an ethoxymethyl group, and an ethoxyethyl group. Examples of the substituted hydrocarbyl groups in which the substituent is a substituted amino group include (N,N-dialkylamino)alkyl groups such as a 2-(N,N-dimethylamino)ethyl group, a 2-(N,N-diethylamino)ethyl group, a 3-(N,N-dimethylamino)propyl group, and a 3-(N,N-diethylamino)propyl group; (N,N-dialkylamino)aryl groups such as a 4-(N,N-dimethylamino)phenyl group, a 3-(N,N-dimethylamino)phenyl group, a 4-(N,N-diethylamino)phenyl group, and a 3-(N,N-diethylamino)phenyl group; (N,N-dialkylamino)alkylaryl groups such as a 4-(N,N-dimethylamino)methylphenyl group and a 4-(N,N-dimethylamino)ethylphenyl group; cyclic amino group-containing alkyl groups such as a 3-pyrrolidinopropyl group, a 3-piperidinopropyl group, and a 3-imidazolylpropyl group;

cyclic amino group-containing aryl groups such as a 4-pyrrolidinophenyl group, a 4-piperidinophenyl group, and a 4-imidazolylphenyl group; and cyclic amino group-containing alkylaryl groups such as a 4-pyrrolidinoethylphenyl group, a 4-piperidinoethylphenyl group, and a 4-imidazolylethylphenyl group.

In the formula (III), the hydrocarbylene group optionally containing a nitrogen atom and/or an oxygen atom as a hetero atom, formed by joining $R^{31}$ and $R^{32}$ refers to a hydrocarbylene group or a hetero atom-containing hydrocarbylene group in which the hetero atom is a nitrogen atom and/or an oxygen atom. The hetero atom-containing hydrocarbylene group in which the hetero atom is a nitrogen atom and/or an oxygen atom may be a hetero atom-containing hydrocarbylene group in which the hetero atom is a nitrogen atom, or a hetero atom-containing hydrocarbylene group in which the hetero atom is an oxygen atom. Examples of the hydrocarbylene groups include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the hetero atom-containing hydrocarbylene groups in which the hetero atom is a nitrogen atom include a group represented by —CH═N—CH═CH— and a group represented by —CH═N—CH$_2$—CH$_2$—. Examples of the hetero atom-containing hydrocarbylene groups in which the hetero atom is an oxygen atom include groups represented by —(CH$_2$)$_s$—O—(CH$_2$)$_t$— where s and t each represent an integer of 1 or more.

In the formula (III), each of the divalent group formed by joining $R^{31}$ and $R^{34}$, and the divalent group for $R^{33}$ may be a hydrocarbylene group, a hetero atom-containing hydrocarbylene group in which the hetero atom is a nitrogen atom, a hetero atom-containing hydrocarbylene group in which the hetero atom is an oxygen atom, a group in which a hydrocarbylene group and an oxygen atom are bonded, or a group in which a hydrocarbylene group and a group represented by —NR$^{35}$— (wherein $R^{35}$ represents a hydrocarbyl group or a hydrogen atom) are bonded. Examples of the hydrocarbylene groups include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the hetero atom-containing hydrocarbylene groups in which the hetero atom is a nitrogen atom include a group represented by —CH═N—CH═CH— and a group represented by —CH═N—CH$_2$—CH$_2$—. Examples of the hetero atom-containing hydrocarbylene groups in which the hetero atom is an oxygen atom include groups represented by —(CH$_2$)$_s$—O—(CH$_2$)$_t$— where s and t each represent an integer of 1 or more. Examples of the groups in which a hydrocarbylene group and an oxygen atom are bonded include groups represented by —(CH$_2$)$_r$—O— where r represents an integer of 1 or more. Examples of the groups in which a hydrocarbylene group and a group represented by —NR$^{35}$— (wherein $R^{35}$ represents a hydrocarbyl group or a hydrogen atom) are bonded include groups represented by —(CH$_2$)$_p$—NR$^{35}$— where $R^{35}$ represents a hydrocarbyl group (preferably a $C_{1-6}$ hydrocarbyl group), or a hydrogen atom; and p represents an integer of 1 or more.

Preferred examples of the compound represented by the formula (III) include compounds represented by the formula (III) in which k is 0, and $R^{34}$ is an optionally substituted hydrocarbyl group or a hydrogen atom, as represented by the following formula (IIIa):

wherein $R^{31}$ represents an optionally substituted hydrocarbyl group, or is joined to $R^{32}$ to form a hydrocarbylene group optionally containing a nitrogen atom and/or an oxygen atom as a hetero atom; $R^{32}$ represents an optionally substituted hydrocarbyl group, or is joined to $R^{31}$ to form a hydrocarbylene group optionally containing a nitrogen atom and/or an oxygen atom as a hetero atom; and $R^{34}$ represents an optionally substituted hydrocarbyl group or a hydrogen atom.

In the formula (IIIa), the description and examples of the optionally substituted hydrocarbyl group for $R^{31}$, $R^{32}$ or $R^{34}$, and the hydrocarbylene group optionally containing a nitrogen atom and/or an oxygen atom as a hetero atom, formed by joining $R^{31}$ and $R^{32}$, are the same as described for the formula (III).

In the formula (IIIa), preferably, $R^{31}$ is a $C_{1-10}$ hydrocarbyl group, or is joined to $R^{32}$ to form a $C_{3-10}$ hydrocarbylene group or a hetero atom-containing $C_{3-10}$ hydrocarbylene group in which the hetero atom is a nitrogen atom. More preferably, $R^{31}$ is a $C_{1-10}$ alkyl group or a $C_{6-10}$ aryl group, or is joined to $R^{32}$ to form a $C_{3-10}$ alkylene group, a group represented by —CH═N—CH═CH—, or a group represented by —CH═N—CH$_2$—CH$_2$—. $R^{31}$ is still more preferably a $C_{1-6}$ alkyl group, and particularly preferably a methyl group or an ethyl group.

In the formula (IIIa), preferably, $R^{32}$ is a $C_{1-10}$ hydrocarbyl group, or is joined to $R^{31}$ to form a $C_{3-10}$ hydrocarbylene group or a hetero atom-containing $C_{3-10}$ hydrocarbylene group in which the hetero atom is a nitrogen atom. More preferably, $R^{32}$ is a $C_{1-10}$ alkyl group or a $C_{6-10}$ aryl group, or is joined to $R^{31}$ to form a $C_{3-10}$ alkylene group, a group represented by —CH═N—CH═CH—, or a group represented by —CH═N—CH$_2$—CH$_2$—. $R^{32}$ is still more preferably a $C_{1-6}$ alkyl group, and particularly preferably a methyl group or an ethyl group.

In the formula (IIIa), $R^{34}$ is preferably a hydrocarbyl group or a hydrogen atom, more preferably a $C_{1-10}$ hydrocarbyl group or a hydrogen atom, still more preferably a $C_{1-6}$ alkyl group or a hydrogen atom, and particularly preferably a hydrogen atom, a methyl group or an ethyl group.

Examples of the compounds represented by the formula (IIIa) in which $R^{34}$ is a hydrocarbyl group include N,N-dihydrocarbylacetamides such as N,N-dimethylacetamide, N,N-diethylacetamide, and N-methyl-N-ethylacetamide; N,N-dihydrocarbylacrylamides such as N-dimethylacrylamide, N,N-diethylacrylamide, and N-methyl-N-ethylacrylamide; and N,N-dihydrocarbylmethacrylamides such as N,N-dimethylmethacrylamide, N,N-diethylmethacrylamide, and N-methyl-N-ethylmethacrylamide.

Examples of the compounds represented by the formula (IIIa) in which $R^{34}$ is a hydrogen atom include N,N-dihydrocarbylformamides such as N,N-dimethylformamide, N,N-dimethylformamide, and N-methyl-N-ethylformamide.

Preferred examples of the compound represented by the formula (III) include compounds represented by the formula (III) in which k is 0, and $R^{34}$ is joined to $R^{31}$ to form a divalent group, as represented by the following formula (IIIb):

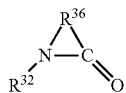
(IIIb)

wherein $R^{32}$ represents an optionally substituted hydrocarbyl group; and $R^{36}$ represents a hydrocarbylene group, or a group in which a hydrocarbylene group and a group represented by —$NR^{35}$— are bonded, where $R^{35}$ represents a hydrocarbyl group or a hydrogen atom.

In the formula (IIIb), the description and examples of the optionally substituted hydrocarbyl group for $R^{32}$ are the same as described for the formula (III).

In the formula (IIIb), examples of the hydrocarbylene groups for $R^{36}$ include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the groups in which a hydrocarbylene group and a group represented by —$NR^{35}$— (wherein $R^{35}$ represents a hydrocarbyl group or a hydrogen atom) are bonded for $R^{36}$ include groups represented by —$(CH_2)_p$—$NR^{35}$— where $R^{35}$ represents a hydrocarbyl group or a hydrogen atom, and p represents an integer of 1 or more.

In the formula (IIIb), $R^{32}$ is preferably a $C_{1-10}$ hydrocarbyl group, more preferably a $C_{1-10}$ alkyl group or a $C_{6-10}$ aryl group, still more preferably a $C_{1-6}$ alkyl group, or a phenyl group, and particularly preferably a methyl group, an ethyl group, or a phenyl group.

In the formula (IIIb), $R^{36}$ is preferably a $C_{1-10}$ hydrocarbylene group, or a group in which a $C_{1-10}$ hydrocarbylene group and a group represented by —$NR^{35}$— (wherein $R^{35}$ represents a hydrocarbyl group (preferably a $C_{1-10}$ hydrocarbyl group) or a hydrogen atom) are bonded, more preferably a $C_{3-6}$ alkylene group or a group represented by —$(CH_2)_p$—$NR^{35}$— (wherein $R^{35}$ represents a hydrocarbyl group (preferably a $C_{1-10}$ hydrocarbyl group), and p represents an integer of 1 or more (preferably an integer of 2 to 5)), and further preferably a trimethylene group, a tetramethylene group, a pentamethylene group, or a group represented by —$(CH_2)_2$—$N(CH_3)$—.

Examples of the compounds represented by the formula (IIIb) in which $R^{36}$ is a hydrocarbylene group include N-hydrocarbyl-β-propiolactams such as N-methyl-β-propiolactam and N-phenyl-β-propiolactam; N-hydrocarbyl-2-pyrrolidones such as N-methyl-2-pyrrolidone, N-vinyl-2-pyrrolidone, N-phenyl-2-pyrrolidone, N-tert-butyl-2-pyrrolidone, and N-methyl-5-methyl-2-pyrrolidone; N-hydrocarbyl-2-piperidones such as N-methyl-2-piperidone, N-vinyl-2-piperidone, and N-phenyl-2-piperidone; N-hydrocarbyl-ε-caprolactams such as N-methyl-ε-caprolactam and N-phenyl-ε-caprolactam; and N-hydrocarbyl-ω-laurilolactams such as N-methyl-ω-laurilolactam and N-vinyl-ω-laurilolactam. Preferred among the above examples are N-phenyl-2-pyrrolidone and N-methyl-ε-caprolactam.

Examples of the compounds represented by the formula (IIIb) in which $R^{36}$ is a group in which a hydrocarbylene group and a group represented by —$NR^{35}$— (wherein $R^{35}$ represents a hydrocarbyl group or a hydrogen atom) are bonded include 1,3-dihydrocarbyl-2-imidazolidinones such as 1,3-dimethyl-2-imidazolidinone, 1,3-diethyl-2-imidazolidinone, 1,3-divinyl-2-imidazolidinone, and 1-methyl-3-ethyl-2-imidazolidinone. Preferred among the above examples is 1,3-dimethyl-2-imidazolidinone.

Preferred examples of the compound represented by the formula (III) include compounds represented by the formula (III) in which k is 1, and $R^{33}$ is a hydrocarbylene group, as represented by the following formula (IIIc):

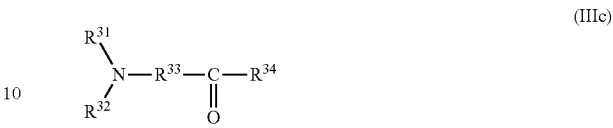
(IIIc)

wherein $R^{31}$ represents an optionally substituted hydrocarbyl group, or is joined to $R^{32}$ to form a hydrocarbylene group optionally containing a nitrogen atom and/or an oxygen atom as a hetero atom; $R^{32}$ represents an optionally substituted hydrocarbyl group, or is joined to $R^{31}$ to form a hydrocarbylene group optionally containing a nitrogen atom and/or an oxygen atom as a hetero atom; $R^{33}$ represents a hydrocarbylene group; and $R^{34}$ represents an optionally substituted hydrocarbyl group or a hydrogen atom.

In the formula (IIIc), the description and examples of the optionally substituted hydrocarbyl group for $R^{31}$, $R^{32}$ or $R^{34}$, the hydrocarbylene group optionally containing a nitrogen atom and/or an oxygen atom as a hetero atom, formed by joining $R^{31}$ and $R^{32}$, and the hydrocarbylene group for $R^{33}$ are the same as described for the formula (III).

In the formula (IIIc), $R^{33}$ is preferably a $C_{1-10}$ hydrocarbylene group, more preferably an a $C_{1-10}$ alkylene group or a $C_{6-10}$ arylene group, still more preferably a $C_{1-6}$ alkylene group or a phenylene group, and particularly preferably an ethylene group, a trimethylene group, or a 1,4-phenylene group.

In the formula (IIIc), $R^{34}$ is preferably a $C_{1-10}$ hydrocarbyl group, or a substituted $C_{1-10}$ hydrocarbyl group in which the substituent is a dialkylamino group, more preferably a $C_{1-6}$ alkyl group, a $C_{6-10}$ aryl group, a $C_{1-6}$ dialkylaminoalkyl group, or a $C_{6-10}$ dialkylaminoaryl group, and still more preferably a methyl group, an ethyl group, a phenyl group, a 3-dimethylaminoethyl group, or a 4-diethylaminophenyl group.

In the formula (IIIc), preferably, $R^{31}$ is a $C_{1-10}$ hydrocarbyl group, or is joined to $R^{32}$ to form a $C_{3-10}$ hydrocarbylene group, or a hetero atom-containing $C_{3-10}$ hydrocarbylene group in which the hetero atom is a nitrogen atom or an oxygen atom. More preferably, $R^{31}$ is a $C_{1-10}$ alkyl group or a $C_{6-10}$ aryl group, or is joined to $R^{32}$ to form a $C_{3-10}$ alkylene group, a group represented by —CH=N—CH=CH—, a group represented by —CH=N—$CH_2$—$CH_2$—, or a group represented by —$(CH_2)_2$—O—$(CH_2)_2$—. Still more preferably, $R^{31}$ is a $C_{1-6}$ alkyl group, or is joined to $R^{32}$ to form a $C_{3-6}$ alkylene group, a group represented by —CH=N—CH=CH—, or a group represented by —CH=N—$CH_2$—$CH_2$—. Particularly preferably, $R^{31}$ is a methyl group or an ethyl group, or is joined to $R^{32}$ to form a tetramethylene group, a hexamethylene group, or a group represented by —CH=N—CH=CH—.

In the formula (IIIc), preferably, $R^{32}$ is a $C_{1-10}$ hydrocarbyl group, or is joined to $R^{31}$ to form a $C_{3-10}$ hydrocarbylene group, or a hetero atom-containing $C_{3-10}$ hydrocarbylene group in which the hetero atom is a nitrogen atom or an oxygen atom. More preferably, $R^{32}$ is a $C_{1-10}$ alkyl group or a $C_{6-10}$ aryl group, or is joined to $R^{31}$ to form a $C_{3-10}$ alkylene group, a group represented by —CH=N—CH=CH—, a group represented by —CH=N—$CH_2$—$CH_2$—, or a group represented by —$(CH_2)_2$—O—$(CH_2)_2$—. Still more preferably, $R^{32}$ is a $C_{1-6}$ alkyl group, or is joined to $R^{31}$ to form a $C_{3-6}$ alkylene group, a group represented by —CH=N—CH=CH—, or a group represented by —CH=N—CH$_2$—CH$_2$—. Particularly preferably, $R^{32}$ is a methyl group or an ethyl group, or is joined to $R^{31}$ to form a tetramethylene group, a hexamethylene group, or a group represented by —CH=N—CH=CH—.

Examples of the compounds represented by the formula (IIIc) in which $R^{34}$ is a hydrocarbyl group include 4-N,N-dihydrocarbylaminoacetophenones such as 4-(N,N-dimethylamino) acetophenone, 4-N-methyl-N-ethylaminoacetophenone, and 4-N,N-diethylaminoacetophenone; and 4-cyclic aminoacetophenone compounds such as 4'-(imidazol-1-yl) acetophenone and 4-pyrazolylacetophenone. Preferred among the above examples are 4-cyclic aminoacetophenone compounds, more preferably 4'-(imidazol-1-yl)acetophenone.

Examples of the compounds represented by the formula (IIIc) in which $R^{34}$ is a substituted hydrocarbyl group include: bis(dihydrocarbylaminoalkyl)ketones such as 1,7-bis(methylethylamino)-4-heptanone and 1,3-bis(diphenylamino)-2-propanone; 4-(dihydrocarbylamino)benzophenones such as 4-N,N-dimethylaminobenzophenone, 4-N,N-di-t-butylaminobenzophenone, and 4-N,N-diphenylaminobenzophenone; and 4,4'-bis(dihydrocarbylamino)benzophenones such as 4,4'-bis(dimethylamino)benzophenone, 4,4'-bis(diethylamino)benzophenone, and 4,4'-bis(diphenylamino)benzophenone. Preferred among the above examples are 4,4'-bis(dihydrocarbylamino)benzophenones, more preferably 4,4'-bis(diethylamino)benzophenone.

Preferred examples of the compound represented by the formula (III) include compounds represented by the formula (III) in which k is 1, and $R^{33}$ is a group in which a hydrocarbylene group and an oxygen atom are bonded, or a group in which a hydrocarbylene group and a group represented by —NR$^{35}$— (wherein $R^{35}$ represents a hydrocarbyl group or a hydrogen atom) are bonded, as represented by the following formula (IIId):

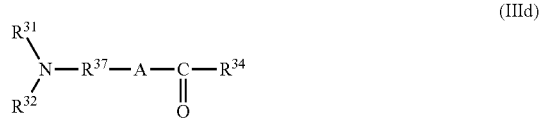

(IIId)

wherein $R^{31}$ represents an optionally substituted hydrocarbyl group, or is joined to $R^{32}$ to form a hydrocarbylene group optionally containing a nitrogen atom and/or an oxygen atom as a hetero atom; $R^{32}$ represents an optionally substituted hydrocarbyl group, or is joined to $R^{31}$ to form a hydrocarbylene group optionally containing a nitrogen atom and/or an oxygen atom as a hetero atom; $R^{37}$ represents a hydrocarbylene group; A represents an oxygen atom or —NR$^{35}$— wherein $R^{35}$ represents a hydrocarbyl group or a hydrogen atom; and $R^{34}$ represents an optionally substituted hydrocarbyl group or a hydrogen atom.

In the formula (IIId), the description and examples of the optionally substituted hydrocarbyl group for $R^{31}$, $R^{32}$ or $R^{34}$, and the hydrocarbylene group optionally containing a nitrogen atom and/or an oxygen atom as a hetero atom, formed by joining $R^{31}$ and $R^{32}$, are the same as described for the formula (III). Moreover, the hydrocarbyl group for $R^{35}$ is as described for the hydrocarbyl group for $R^{31}$, $R^{32}$, or $R^{34}$.

In the formula (IIId), A is preferably an oxygen atom or a group represented by —NR$^{35}$— (wherein $R^{35}$ represents a hydrocarbyl group (preferably a $C_{1-5}$ hydrocarbyl group) or a hydrogen atom), more preferably an oxygen atom or a group represented by —NH—, and still more preferably a group represented by —NH—.

In the formula (IIId), examples of the hydrocarbylene groups for $R^{37}$ include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group.

In the formula (IIId), $R^{34}$ is preferably a $C_{1-10}$ hydrocarbyl group, more preferably a $C_{2-6}$ alkenyl group, and still more preferably a vinyl group.

In the formula (IIId), $R^{37}$ is preferably a $C_{1-10}$ hydrocarbylene group, more preferably a $C_{1-6}$ alkylene group, still more preferably an ethylene group or a trimethylene group, and particularly preferably a trimethylene group.

In the formula (IIId), preferably, $R^{31}$ is a $C_{1-10}$ hydrocarbyl group, or is joined to $R^{32}$ to form a $C_{3-10}$ hydrocarbylene group, or a hetero atom-containing $C_{3-10}$ hydrocarbylene group in which the hetero atom is a nitrogen atom or an oxygen atom. More preferably, $R^{31}$ is a $C_{1-10}$ alkyl group or a $C_{6-10}$ aryl group, or is joined to $R^{32}$ to form a $C_{3-10}$ alkylene group, a group represented by —CH=N—CH=CH—, a group represented by —CH=N—CH$_2$—CH$_2$—, or a group represented by —(CH$_2$)$_2$—O—(CH$_2$)$_2$—. Still more preferably, $R^{31}$ is a $C_{1-6}$ alkyl group, or is joined to $R^{32}$ to form a $C_{3-6}$ alkylene group, a group represented by —CH=N—CH=CH—, or a group represented by —CH=N—CH$_2$—CH$_2$—. Particularly preferably, $R^{31}$ is a methyl group or an ethyl group, or is joined to $R^{32}$ to form a tetramethylene group, a hexamethylene group, or a group represented by —CH=N—CH=CH—.

In the formula (IIId), preferably, $R^{32}$ is a $C_{1-10}$ hydrocarbyl group, or is joined to $R^{31}$ to form a $C_{3-10}$ hydrocarbylene group, or a hetero atom-containing $C_{3-10}$ hydrocarbylene group in which the hetero atom is a nitrogen atom or an oxygen atom. More preferably, $R^{32}$ is a $C_{1-10}$ alkyl group or a $C_{6-10}$ aryl group, or is joined to $R^{31}$ to form a $C_{3-10}$ alkylene group, a group represented by —CH=N—CH=CH—, a group represented by —CH=N—CH$_2$—CH$_2$—, or a group represented by —(CH$_2$)$_2$—O—(CH$_2$)$_2$—. Still more preferably, $R^{32}$ is a $C_{1-6}$ alkyl group, or is joined to $R^{31}$ to form a $C_{3-6}$ alkylene group, a group represented by —CH=N—CH=CH—, or a group represented by —CH=N—CH$_2$—CH$_2$—. Particularly preferably, $R^{32}$ is a methyl group or an ethyl group, or is joined to $R^{31}$ to form a tetramethylene group, a hexamethylene group, or a group represented by —CH=N—CH=CH—.

Examples of the compounds represented by the formula (IIId) in which A is an oxygen atom include: 2-N,N-dihydrocarbylaminoethyl acrylates such as 2-N,N-dimethylaminoethyl acrylate and 2-N,N-diethylaminoethyl acrylate; 3-N,N-dihydrocarbylaminopropyl acrylates such as 3-N,N-dimethylaminopropyl acrylate; 2-N,N-dihydrocarbylaminoethyl methacrylates such as 2-N,N-dimethylaminoethyl methacrylate and 2-N,N-diethylaminoethyl methacrylate; and 3-N,N-dihydrocarbylaminopropyl methacrylates such as 3-N,N-dimethylaminopropyl methacrylate. Preferred are 3-N,N-dihydrocarbylaminopropyl acrylates, more preferably 3-N,N-dimethylaminopropyl acrylate.

Examples of the compounds represented by the formula (IIId) in which A is a group represented by —NR$^{35}$— (wherein $R^{35}$ represents a hydrocarbyl group or a hydrogen atom) include: N,N-dihydrocarbylaminoethyl acrylamides such as N,N-dimethylaminoethyl acrylamide and N,N-diethylaminoethyl acrylamide; N,N-dihydrocarbylaminopropyl acrylamides such as N,N-dimethylaminopropyl acrylamide and N,N-diethylaminopropyl acrylamide; N,N-dihydrocarbylaminobutyl acrylamides such as N,N-dimethylaminobutyl acrylamide and N,N-diethylaminobutyl acrylamide; N,N-dihydrocarbylaminoethyl methacrylamides such as N,N-dimethylaminoethyl methacrylamide and N,N-diethylaminoethyl methacrylamide; N,N-dihydrocarbylaminopropyl methacrylamides such as N,N-dimethylaminopropyl methacrylamide and N,N-diethylaminopropyl methacrylamide; and N,N-dihydrocarbylaminobutyl methacrylamides such as N,N-dimethylaminobutyl methacrylamide and N,N-diethylaminobutyl methacrylamide. Preferred are N,N-dihydrocarbylaminopropyl acrylamides, more preferably N,N-dimethylaminopropyl acrylamide.

The compound represented by the formula (III) is preferably a compound represented by the formula (IIId), particularly preferably an N,N-dihydrocarbylaminopropyl acrylamide, and most preferably N,N-dimethylaminopropyl acrylamide.

In addition to those described above, preferred examples of the compound containing a nitrogen atom and/or a silicon atom include alkoxysilyl group-containing compounds.

The alkoxysilyl group-containing compound is preferably a compound containing a nitrogen atom and an alkoxysilyl group, and more preferably a compound represented by the following formula (IV):

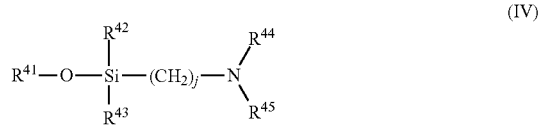

wherein $R^{41}$ represents a hydrocarbyl group; $R^{42}$ and $R^{43}$ each represent a hydrocarbyl group or a hydrocarbyloxy group; $R^{44}$ represents an optionally substituted hydrocarbyl group or a trihydrocarbylsilyl group, or is joined to $R^{45}$ to form a hydrocarbylene group optionally containing at least one, as a hetero atom, selected from the group consisting of a silicon atom, a nitrogen atom and an oxygen atom; $R^{45}$ represents an optionally substituted hydrocarbyl group or a trihydrocarbylsilyl group, or is joined to $R^{44}$ to form a hydrocarbylene group optionally containing at least one, as a hetero atom, selected from the group consisting of a silicon atom, a nitrogen atom and an oxygen atom; and j represents an integer of 1 to 5.

In the formula (IV), the optionally substituted hydrocarbyl group refers to a hydrocarbyl group or a substituted hydrocarbyl group. Examples of the hydrocarbyl groups include alkyl groups such as a methyl group, an ethyl group, an n-propyl group, an isopropyl group, and an n-butyl group; alkenyl groups such as a vinyl group, an allyl group, and an isopropenyl group; and aryl groups such as a phenyl group, preferably alkyl groups, and more preferably a methyl group or an ethyl group. Examples of the substituted hydrocarbyl groups include oxacycloalkyl groups such as an oxiranyl group and a tetrahydrofuranyl group, preferably a tetrahydrofuranyl group.

Herein, an oxacycloalkyl group refers to a group in which a $CH_2$ on an alicycle of a cycloalkyl group is replaced with an oxygen atom.

Examples of the hydrocarbyloxy groups include alkoxy groups such as a methoxy group, an ethoxy group, an n-propoxy group, an isopropoxy group, an n-butoxy group, a sec-butoxy group, and a tert-butoxy group; and aryloxy groups such as a phenoxy group and a benzyloxy group, preferably alkoxy groups, and more preferably a methoxy group or an ethoxy group.

Examples of the trihydrocarbylsilyl groups include a trimethylsilyl group and a tert-butyl-dimethylsilyl group, preferably a trimethylsilyl group.

The hydrocarbylene group optionally containing at least one, as a hetero atom, selected from the group consisting of a silicon atom, a nitrogen atom and an oxygen atom refers to a hydrocarbylene group, or a hetero atom-containing hydrocarbylene group in which the hetero atom is at least one selected from the group consisting of a silicon atom, a nitrogen atom and an oxygen atom. The hetero atom-containing hydrocarbylene group in which the hetero atom is at least one selected from the group consisting of a silicon atom, a nitrogen atom and an oxygen atom may be a hetero atom-containing hydrocarbylene group in which the hetero atom is a silicon atom, a hetero atom-containing hydrocarbylene group in which the hetero atom is a nitrogen atom, or a hetero atom-containing hydrocarbylene group in which the hetero atom is an oxygen atom. Examples of the hydrocarbylene groups include alkylene groups such as a tetramethylene group, a pentamethylene group, a hexamethylene group, a pentan-2-en-1,5-diyl group, and a 2,2,4-trimethylhexane-1,6-diyl group. Preferred among them are $C_{4-7}$ alkylene groups, particularly preferably a pentamethylene group or a hexamethylene group. Examples of the hetero atom-containing hydrocarbylene groups in which the hetero atom is a silicon atom include a group represented by —$Si(CH_3)_2$—$CH_2$—$CH_2$—$Si(CH_3)_2$—. Examples of the hetero atom-containing hydrocarbylene groups in which the hetero atom is a nitrogen atom include a group represented by —CH=N—CH=CH—, and a group represented by —CH=N—$CH_2$—$CH_2$—. Examples of the hetero atom-containing hydrocarbylene groups in which the hetero atom is an oxygen atom include a group represented by —$CH_2$—$CH_2$—O—$CH_2$—$CH_2$—.

In the formula (IV), $R^{41}$ is preferably a $C_{1-4}$ alkyl group, and more preferably a methyl group or an ethyl group. Each of $R^{42}$ and $R^{43}$ is preferably a hydrocarbyloxy group, more preferably a $C_{1-4}$ alkoxy group, and still more preferably a methoxy group or an ethoxy group. Each of $R^{44}$ and $R^{45}$ is preferably a hydrocarbyl group, more preferably a $C_{1-4}$ alkyl group, and still more preferably a methyl group or an ethyl group. Moreover, j is preferably an integer of 2 to 4.

Examples of the compounds represented by the formula (IV) include: [(dialkylamino)alkyl]alkoxysilane compounds such as 3-dimethylaminopropyltriethoxysilane, 3-dimethylaminopropyltrimethoxysilane, 3-diethylaminopropyltriethoxysilane, 3-diethylaminopropyltrimethoxysilane, 3-dimethylaminopropylmethyldiethoxysilane, 2-dimethylaminoethyltriethoxysilane, and 2-dimethylaminoethyltrimethoxysilane; cyclic aminoalkylalkoxysilane compounds such as hexamethyleneiminomethyltrimethoxysilane, 3-hexamethyleneiminopropyltriethoxysilane, N-(3-triethoxysilylpropyl)-4,5-dihydroimidazole, and N-(3-trimethoxysilylpropyl)-4,5-imidazole; [di(tetrahydrofuranyl)amino]alkylalkoxysilane compounds such as 3-[di(tetrahydrofuranyl)amino]propyltrimethoxysilane and 3-[di(tetrahydrofuranyl)amino]propyltriethoxysilane; and N,N-bis(trialkylsilyl)aminoalkylalkoxysilane compounds such as N,N-bis(trimethylsilyl)aminopropylmethyldimethoxysilane and N,N-bis(trimethylsilyl)aminopropylmethyldiethoxysilane. Preferred among the above examples are [(dialkylamino)alkyl]alkoxysilane compounds, more preferably 3-dimethylaminopropyltriethoxysilane, 3-dimethylaminopropyltrimethoxysilane, 3-diethylaminopropyltriethoxysilane, and 3-diethylaminopropyltrimethoxysilane.

Examples of the alkoxysilyl group-containing compounds include, in addition to the aforementioned compounds containing a nitrogen atom and an alkoxysilyl group, tetraalkoxysilanes such as tetramethoxysilane, tetraethoxysilane, and tetra-n-propoxysilane; trialkoxyhydrocarbylsilanes such as methyltrimethoxysilane, methyltriethoxysilane, ethyltrimethoxysilane, and phenyltrimethoxysilane; trialkoxyhalosilanes such as trimethoxychlorosilane, triethoxychlorosilane, and tri-n-propoxychlorosilane; dialkoxydihydrocarbylsilanes such as dimethoxydimethylsilane, diethoxydimethylsilane, and dimethoxydiethylsilane; dialkoxydihalosilanes such as dimethoxydichlorosilane, diethoxydichlorosilane, and di-n-propoxydichlorosilane; monoalkoxytrihydrocarbylsilanes such as methoxytrimethylsilane; monoalkoxytrihalosilanes such as methoxytrichlorosilane and ethoxytrichlorosilane; (glycidoxyalkyl)alkoxysilane compounds such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, and (3-glycidoxypropyl)methyldimethoxysilane; (3,4-epoxycyclohexyl)alkylalkoxysilane compounds such as 2-(3,4-epoxycyclohexyl)ethyltrimethoxysilane, 2-(3,4-epoxycyclohexyl)ethyltriethoxysilane, and 2-(3,4-epoxycyclohexyl)ethyl(methyl)dimethoxysilane; alkoxysilylalkylsuccinic anhydrides such as 3-trimethoxysilylpropylsuccinic anhydride and 3-triethoxysilylpropylsuccinic anhydride; and (methacryloyloxyalkyl)alkoxysilane compounds such as 3-methacryloyloxypropyltrimethoxysilane and 3-methacryloyloxypropyltriethoxysilane.

The alkoxysilyl group-containing compound may also contain a nitrogen atom and a carbonyl group. Examples of the compounds containing a nitrogen atom and a carbonyl group as well as an alkoxysilyl group include tris[(alkoxysilyl)alkyl]isocyanurate compounds such as tris[3-(trimethoxysilyl)propyl]isocyanurate, tris[3-(triethoxysilyl)propyl]isocyanurate, tris[3-(tripropoxysilyl)propyl]isocyanurate, and tris[3-(tributoxysilyl)propyl]isocyanurate. Preferred among them is tris[3-(trimethoxysilyl)propyl]isocyanurate.

Other examples of the compounds containing a nitrogen atom and/or a silicon atom include N,N-dialkyl-substituted carboxylic acid amide dialkyl acetal compounds. Examples of the N,N-dialkyl-substituted carboxylic acid amide dialkyl acetal compounds include N,N-dialkylformamide dialkyl acetals such as N,N-dimethylformamide dimethyl acetal and N,N-diethylformamide dimethyl acetal; N,N-dialkylacetamide dialkyl acetals such as N,N-dimethylacetamide dimethyl acetal and N,N-diethylacetamide dimethyl acetal; and N,N-dialkylpropionamide dialkyl acetals such as N,N-dimethylpropionamide dimethyl acetal and N,N-diethylpropionamide dimethyl acetal. Preferred among them are N,N-dialkylformamide dialkyl acetals, more preferably N,N-dimethylformamide dimethyl acetal.

In the method of producing the modified SBR, a coupling agent may be added to a solution of the modified SBR in a hydrocarbon at any time from the initiation of the polymerization of monomers before the recovery of the polymer as described later. Examples of the coupling agents include compounds represented by the following formula (V):

$$R^{51}{}_a ML_{4-a} \quad (V)$$

wherein $R^{51}$ represents an alkyl group, an alkenyl group, a cycloalkenyl group, or an aryl group; M represents a silicon atom or a tin atom; L represents a halogen atom or a hydrocarbyloxy group; and a represents an integer of 0 to 2.

Examples of the coupling agents represented by the formula (V) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

In terms of enhancing the processability of the conjugated diene polymer, the amount of the coupling agent to be added per mol of the alkali metal derived from an alkali metal catalyst is preferably not less than 0.03 mol and more preferably not less than 0.05 mol. In terms of enhancing fuel economy, the amount is preferably not more than 0.4 mol and more preferably not more than 0.3 mol.

In the method of producing the modified SBR, unreacted active terminals may be treated with alcohol, such as methanol or isopropyl alcohol, before the recovery of the polymer as described later.

The modified SBR may be recovered from the solution of the modified SBR in a hydrocarbon by a known method. Examples of this method include: (A) a method of adding a coagulant to the solution of the modified SBR in a hydrocarbon; and (B) a method of adding steam to the solution of the modified SBR in a hydrocarbon (steam stripping treatment). The recovered modified SBR may be dried with a known dryer, such as a band dryer or an extrusion dryer.

In terms of achieving a balanced enhancement in processability, fuel economy, rubber strength, wet-grip performance, and handling stability, the amount of the structural unit derived from the polymerization initiator represented by the formula (I) in the modified SBR, when expressed per unit mass of the polymer, is preferably not less than 0.0001 mmol/g polymer, and more preferably not less than 0.001 mmol/g polymer, whereas it is preferably not more than 0.15 mmol/g polymer, and more preferably not more than 0.1 mmol/g polymer.

In terms of achieving a balanced enhancement in processability, fuel economy, rubber strength, wet-grip performance, and handling stability, the amount of the structural unit derived from the silicon-containing vinyl compound in the modified SBR, when expressed per unit mass of the polymer, is preferably not less than 0.01 mmol/g polymer, and more preferably not less than 0.02 mmol/g polymer, whereas it is preferably not more than 0.4 mmol/g polymer, and more preferably not more than 0.2 mmol/g polymer.

In terms of achieving a balanced enhancement in processability, fuel economy, rubber strength, wet-grip performance, and handling stability, the modified SBR preferably contains a structural unit derived from the compound represented by the formula (II). The structural unit derived from the compound represented by the formula (II) in the modified SBR refers to a structural unit represented by the following formula (IIb):

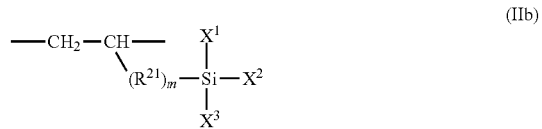

wherein m, $R^{21}$, $X^1$, $X^2$, and $X^3$ are as defined in the formula (II).

In the modified SBR, at least one of $X^1$, $X^2$ and $X^3$ in the structural unit derived from the compound represented by the formula (II) in the conjugated diene polymer is preferably replaced by a hydroxy group, more preferably two or more of $X^1$, $X^2$ and $X^3$ are replaced by hydroxy groups, and still more preferably two of $X^1$, $X^2$ and $X^3$ are replaced by hydroxy groups. This can enhance the effects of improving processability, fuel economy, rubber strength, wet-grip performance, and handling stability. Non-limiting examples of the method of replacing at least one of $X^1$, $X^2$, and $X^3$ with a hydroxy group include steam stripping treatment.

The rubber composition of the present invention includes a low molecular weight conjugated diene polymer having a glass transition temperature of −75 to 0° C. and a weight average molecular weight (Mw) of at least $1.0 \times 10^3$ but less than $1.5 \times 10^5$.

It should be noted that the low molecular weight conjugated diene polymer is not included in the rubber component.

The low molecular weight conjugated diene polymer preferably has a weight average molecular weight (Mw) of $1.0 \times 10^3$ to $5.0 \times 10^3$ because then processability and wet-grip performance can be more improved.

The low molecular weight conjugated diene polymer has a Tg of not lower than −75° C., preferably not lower than −65° C. A Tg lower than −75° C. tends to lead to reduced wet-grip performance. The conjugated diene polymer preferably has a Tg of not higher than 0° C., more preferably not higher than −10° C. The conjugated diene polymer with a Tg higher than 0° C. tends to have poor compatibility with the SBR (A) and SBR (B) and thus fuel economy or abrasion resistance tends to deteriorate.

The amount of the low molecular weight conjugated diene polymer for each 100 parts by mass of the rubber component is not less than 1 part by mass, preferably not less than 3 parts by mass. If the amount is less than 1 part by mass, the improving effect of the low molecular weight conjugated diene polymer may not be sufficiently achieved. The amount of the low molecular weight conjugated diene polymer is not more than 30 parts by mass, preferably not more than 26 parts by mass. If the amount is more than 30 parts by mass, then fuel economy tends to deteriorate.

The low molecular weight conjugated diene polymer may be obtained, for example, by copolymerizing an aromatic vinyl compound and a conjugated diene compound as monomers in the presence of a polymerization initiator. Examples of the aromatic vinyl compounds include styrene, p-methylstyrene, m-methylstyrene, p-tert-butylstyrene, α-methylstyrene, chloromethylstyrene, and vinyltoluene, among which styrene is preferred. Examples of the conjugated diene compounds include 1,3-butadiene, isoprene, 1,3-pentadiene, and 2,3-dimethylbutadiene, among which 1,3-butadiene is preferred. Thus, the low molecular weight conjugated diene polymer is preferably a copolymer of styrene and 1,3-butadiene.

In the case where the low molecular weight conjugated diene polymer is a copolymer of styrene and 1,3-butadiene, the low molecular weight conjugated diene polymer preferably has a vinyl bond content in a 1,3-butadiene moiety of not less than 20 mol %, more preferably not less than 40 mol %, whereas the vinyl bond content is preferably not more than 70 mol %, and more preferably not more than 60 mol %. The low molecular weight conjugated diene polymer preferably has a styrene content of not less than 10% by mass, more preferably not less than 12% by mass, whereas the styrene content is preferably not more than 45% by mass, and more preferably not more than 42% by mass.

The rubber composition of the present invention includes a silica having a nitrogen adsorption specific surface area ($N_2SA$) of 40 to 400 $m^2/g$. Non-limiting examples of the silica include dry silica (anhydrous silica) and wet silica (hydrous silica). Wet silica is preferred because it has more silanol groups. The silica may be used alone, or two or more kinds of the silica may be used in combination.

The silica has a nitrogen adsorption specific surface area ($N_2SA$) of not less than 40 $m^2/g$, preferably not less than 50 $m^2/g$, and more preferably not less than 60 $m^2/g$. Silica having a $N_2SA$ less than 40 $m^2/g$ tends to have a little reinforcement and thus rubber strength tends to decrease. The silica has a $N_2SA$ of not more than 400 $m^2/g$, preferably not more than 360 $m^2/g$, and more preferably not more than 300 $m^2/g$. Silica having a $N_2SA$ more than 400 $m^2/g$ tends not to easily disperse and thus fuel economy and processability tend to deteriorate.

The $N_2SA$ values of silica are determined by the BET method in accordance with ASTM D3037-93.

The amount of the silica for each 100 parts by mass of the rubber component is not less than 10 parts by mass, preferably not less than 30 parts by mass, and more preferably not less than 45 parts by mass. If the amount is less than 10 parts by mass, the effect of the silica added tends not to be sufficiently achieved and thus rubber strength tends to decrease. The amount of the silica is not more than 150 parts by mass, preferably not more than 100 parts by mass. If the amount exceeds 150 parts by mass, then processability tends to deteriorate.

The silica may be used together with a silane coupling agent. Examples of silane coupling agents include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazolyl tetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, and dimethoxymethylsilylpropylbenzothiazole tetrasulfide. Preferred among these are bis(3-triethoxysilylpropyl)tetrasulfide and 3-trimethoxysilylpropylbenzothiazolyl tetrasulfide in terms of the reinforcement-improving effect and the like. The silane coupling agents may be used alone, or two or more kinds of the silane coupling agents may be used in combination.

The amount of silane coupling agent for each 100 parts by mass of silica is preferably not less than 1 part by mass, and more preferably not less than 2 parts by mass. If the amount is less than 1 part by mass, the resulting unvulcanized rubber composition tends to have high viscosity so that processability can be deteriorated. Also, the amount of silane coupling agent is preferably not more than 20 parts by mass, and more preferably not more than 15 parts by mass. If the amount exceeds 20 parts by mass, the effect commensurate with the cost increase tends not to be obtained.

Known additives may be used, and examples thereof include vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organic peroxides; fillers such as carbon black, calcium carbonate, talc, alumina, clay, aluminum hydroxide, and mica; processing aids such as extender oils and lubricants; and antioxidants.

Examples of the carbon black include furnace black (furnace carbon black) such as SAF, ISAF, HAF, MAF, FEF, SRF, GPF, APF, FF, CF, SCF or ECF; acetylene black (acetylene carbon black); thermal black (thermal carbon black) such as FT or MT; channel black (channel carbon black) such as EPC, MPC or CC; and graphite. These may be used alone or two or more of these may be used in combination.

The amount of carbon black for each 100 parts by mass of the rubber component is preferably not less than 1 part by mass, more preferably not less than 6 parts by mass, and still more preferably not less than 10 parts by mass. If the amount is less than 1 part by mass, then sufficient reinforcement may not be achieved. The amount of carbon black is preferably not more than 60 parts by mass, more preferably not more than 30 parts by mass, and still more preferably not more than 20 parts by mass. If the amount is more than 60 parts by mass, fuel economy tends to deteriorate.

The nitrogen adsorption specific surface area ($N_2SA$) of carbon black is usually 5 to 200 $m^2/g$, and preferably the lower limit and the upper limit thereof are 50 $m^2/g$ and 150 $m^2/g$, respectively. The dibutyl phthalate (DBP) absorption of carbon black is usually 5 to 300 mL/100 g, and preferably the lower limit and the upper limit thereof are 80 mL/100 g and 180 mL/100 g, respectively. If the $N_2SA$ or DBP absorption of carbon black is lower than the lower limit of the range mentioned above, the reinforcement effect tends to be small and thus rubber strength tends to decrease. If the $N_2SA$ or DBP absorption of carbon black is larger than the upper limit of the range mentioned above, the carbon black tends to poorly disperse and thus hysteresis loss tends to increase so that fuel economy can be reduced. The nitrogen adsorption specific surface area is measured in accordance with ASTM D4820-93. The DBP absorption amount is measured in accordance with ASTM D2414-93. Examples of commercially available carbon blacks include SEAST 6, SEAST 7HM, and SEAST KH (trade names, produced by Tokai Carbon Co., Ltd.), and CK 3 and Special Black 4A (trade names, produced by Evonik Degussa).

Examples of the extender oils include aromatic mineral oils (viscosity gravity constant (V.G.C. value): 0.900 to 1.049), naphthenic mineral oils (V.G.C. value: 0.850 to 0.899), and paraffinic mineral oils (V.G.C. value: 0.790 to 0.849). The polycyclic aromatics content in the extender oil is preferably less than 3% by mass, and more preferably less than 1% by mass. The polycyclic aromatics content is measured according to the British Institute of Petroleum 346/92 method. The aromatic compound content (CA) in the extender oil is preferably not less than 20% by mass. Two or more kinds of these extender oils may be used in combination. Aromatic mineral oils (aromatic oils) and paraffinic mineral oils (mineral oils) are preferred among these extender oils, with a combination of an aromatic oil and a mineral oil being more preferred.

In terms of achieving the effect of the present invention well, the combined amount of extender oil (oil) and the low molecular weight conjugated diene polymer for each 100 parts by mass of the rubber component is preferably not less than 10 parts by mass, and more preferably not less than 20 parts by mass, whereas it is preferably not more than 50 parts by mass, and more preferably not more than 40 parts by mass.

Examples of the vulcanization accelerators include thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. The amount thereof is preferably 0.1 to 5 parts by mass, and more preferably 0.2 to 3 parts by mass, for each 100 parts by mass of the rubber component.

The rubber composition may be prepared from the SBRs (A) and (B) combined with other rubber materials, additives and the like according to a known method, for example, by kneading components with a known mixer such as a roll mill or a Banbury mixer.

With regard to the kneading conditions when additives other than vulcanizing agents and vulcanization accelerators are mixed, the kneading temperature is usually 50 to 200° C., preferably 80 to 190° C., and the kneading time is usually 30 seconds to 30 minutes, preferably 1 minute to 30 minutes. When a vulcanizing agent and a vulcanization accelerator are mixed, the kneading temperature is usually not higher than 100° C., and preferably ranges from room temperature to 80° C. The composition containing a vulcanizing agent and a vulcanization accelerator is usually used after it is vulcanized by press vulcanization or the like. The vulcanization temperature is usually 120 to 200° C., preferably 140 to 180° C.

The rubber composition of the present invention has a tan δ peak temperature of not lower than −20° C. If the rubber composition has a tan δ peak temperature lower than −20° C., sufficient wet-grip performance may not be ensured. The rubber composition of the present invention preferably has a tan δ peak temperature of not higher than −5° C., more preferably not higher than −8° C. If the rubber composition has a tan δ peak temperature higher than −5° C., wet-grip performance tends not to be sufficiently achieved in a wide temperature range because of its increased temperature dependence.

The tan δ peak temperature values are measured by a method described in examples.

The rubber composition of the present invention provides balanced fuel economy, wet-grip performance, abrasion resistance, and handling stability at high levels; in addition, the rubber composition is excellent in processability, rubber strength, and the temperature dependence of wet-grip performance.

The rubber composition of the present invention can be used for components of a tire, particularly suitably for treads.

The pneumatic tire of the present invention can be prepared using the rubber composition by a conventional method. Specifically, the unvulcanized rubber composition containing various additives as necessary is extruded and processed into the shape of a tire component (e.g. tread), and then formed in a conventional manner on a tire building machine and assembled with other tire components to build an unvulcanized tire. Then, the unvulcanized tire is heated and pressed in a vulcanizer, whereby a pneumatic tire of the present invention can be produced.

The pneumatic tire of the present invention can be suitably used as tires for passenger vehicles.

EXAMPLES

The present invention is more specifically described by reference to examples. However, the present invention is not limited thereto.

The following is a list of the chemical agents used in the synthesis or polymerization. The chemical agents were purified, if needed, by usual methods.
THF: anhydrous tetrahydrofuran, produced by Kanto Chemical Co., Inc.
Sodium hydride: produced by Kanto Chemical Co., Inc.
Diethylamine: produced by Kanto Chemical Co., Inc.
Methylvinyldichlorosilane: produced by Shin-Etsu Chemical Co., Ltd.
Anhydrous hexane: produced by Kanto Chemical Co., Inc.
Styrene: produced by Kanto Chemical Co., Inc.
Butadiene: 1,3-butadiene, produced by Tokyo Chemical Industry Co., Ltd.
TMEDA: tetramethylethylenediamine, produced by Kanto Chemical Co., Inc.
Initiator (1): 1.6 M n-butyllithium in hexane, produced by Kanto Chemical Co., Inc.
Initiator (2): AI-200CE2 (compound formed by bonding 3-(N,N-dimethylamino)-1-propyllithium and two isoprene-derived structural units, as represented by the following formula) (0.9 M), produced by FMC

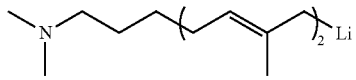

2,6-Di-tert-butyl-p-cresol: Nocrac 200, produced by Ouchi Shinko Chemical Industrial Co., Ltd.
Bis(dimethylamino)methylvinylsilane: produced by Shin-Etsu Chemical Co., Ltd.
N,N-dimethylaminopropyl acrylamide: produced by Tokyo Chemical Industry Co., Ltd.
3-Diethylaminopropyltriethoxysilane: produced by Azmax Co
1,3-Dimethyl-2-imidazolidinone: produced by Tokyo Chemical Industry Co., Ltd.
Tris[3-(trimethoxysilyl)propyl]isocyanurate: produced by Shin-Etsu Chemical Co., Ltd.
N,N-dimethylformamide dimethyl acetal: produced by Tokyo Chemical Industry Co., Ltd.
<Preparation of Modifier (1) (Main Chain Modifier)>

In a nitrogen atmosphere, 15.8 g of bis(dimethylamino)methylvinylsilane was charged into a 100-mL volumetric flask, and anhydrous hexane was also added to increase the total amount to 100 mL. In this manner, a modifier (1) was prepared.
<Preparation of Modifier (2) (Terminal Modifier)>

In a nitrogen atmosphere, 15.6 g of N,N-dimethylaminopropyl acrylamide was charged into a 100-mL volumetric flask, and anhydrous hexane was also added to increase the total amount to 100 mL. In this manner, a modifier (2) was prepared.
<Preparation of Modifier (3) (Main Chain Modifier)>

THF (1000 mL) and sodium hydride (13 g) were charged into a sufficiently nitrogen-purged 2-L three-necked flask, and diethylamine (36.5 g) was slowly added dropwise to the mixture on an ice water bath while stirring. After stirring for 30 minutes, methylvinyldichlorosilane (36 g) was added dropwise over 30 minutes, followed by stirring for 2 hours. The resulting solution was concentrated, filtered, and purified by distillation under reduced pressure to synthesize bis(diethylamino)methylvinylsilane. The bis(diethylamino)methylvinylsilane (21.4 g) was charged into a 100-mL volumetric flask in a nitrogen atmosphere, and anhydrous hexane was also added to increase the total amount to 100 mL.
<Preparation of Modifier (4) (Terminal Modifier)>

In a nitrogen atmosphere, 3-diethylaminopropyltriethoxysilane (27.7 g) was charged into a 100-mL volumetric flask, and anhydrous hexane was also added to increase the total amount to 100 mL. In this manner, a modifier (4) was prepared.
<Preparation of Modifier (5) (Terminal Modifier)>

In a nitrogen atmosphere, 1,3-dimethyl-2-imidazolidinone (11.4 g) was charged into a 100-mL volumetric flask, and anhydrous hexane was also added to increase the total amount to 100 mL. In this manner, a modifier (5) was prepared.
<Preparation of Modifier (6) (Terminal Modifier)>

In a nitrogen atmosphere, tris[3-(trimethoxysilyl)propyl]isocyanurate (30.7 g) was charged into a 100-mL volumetric flask, and anhydrous hexane was also added to increase the total amount to 200 mL. In this manner, a modifier (6) was prepared.
<Preparation of Modifier (7) (Terminal Modifier)>

In a nitrogen atmosphere, N,N-dimethylformamide dimethyl acetal (11.9 g) was charged into a 100-mL volumetric flask, and anhydrous hexane was also added to increase the total amount to 200 mL. In this manner, a modifier (7) was prepared.
<Copolymer Analysis>

Copolymers (SBRs) and low molecular weight copolymers (low molecular weight conjugated diene polymers) obtained as mentioned later were analyzed by the following methods.
<Measurement of Weight Average Molecular Weight (Mw) and Number Average Molecular Weight (Mn)>

The weight average molecular weight (Mw) and number average molecular weight (Mn) of each of the copolymers and low molecular weight copolymers were measured using gel permeation chromatography (GPC) (GPC-8000 series produced by Tosoh Corporation, detector: differential refractometer, column: TSKGEL SUPERMULTIPORE HZ-M produced by Tosoh Corporation), and expressed relative to polystyrene standards. A molecular weight distribution Mw/Mn was calculated from the measurement results.
<Structural Identification>

The structures (styrene content, vinyl content) of the copolymers and low molecular weight conjugated diene polymers were identified with a device of JNM-ECA series produced by JEOL Ltd. Each polymer (0.1 g) was dissolved in toluene (15 mL), and the solution was slowly poured in methanol (30 mL) for reprecipitation. The resulting precipitate was dried under reduced pressure and then measured.
<Measurement of Glass Transition Temperature>

The midpoint glass transition temperature was measured at a rate of temperature rise of 10° C./min. with a differential scanning calorimeter Q200 (produced by TA Instruments Japan Inc.) in accordance with JIS-K7121.
<Synthesis of Copolymer (1)> n-Hexane (18 L), styrene (550 g), butadiene (1450 g), and TMEDA (10 mmol) were charged into a sufficiently nitrogen-purged 30-L pressure-resistant container, and heated to 40° C. After further addition of the initiator (1) (34 mL), the mixture was heated to 50° C., and stirred for 3 hours. Next, the modifier (4) (40 mL) was added, followed by stirring for 30 minutes. The reaction solution was mixed with methanol (15 mL) and 2,6-tert-butyl-p-cresol (0.1 g). Thereafter, a coagulum was recovered from the polymer solution by steam stripping treatment, and the coagulum was dried under reduced pressure for 24 hours to give a copolymer (1).

Here, 1.18 mol of the compound (modifier (4)) containing a nitrogen atom and/or a silicon atom was introduced per mol of the alkali metal derived from the polymerization initiator introduced.

<Synthesis of Copolymer (2)>

A copolymer (2) was produced based on the same formulation as that for the synthesis of the copolymer (1), except that the amounts of styrene and butadiene were changed to 300 g and 1700 g, respectively.

Here, 1.18 mol of the compound (modifier (4)) containing a nitrogen atom and/or a silicon atom was introduced per mol of the alkali metal derived from the polymerization initiator introduced.

<Synthesis of Copolymer (3)>

A copolymer (3) was produced based on the same formulation as that for the synthesis of the copolymer (1), except that the amounts of styrene and butadiene were changed to 800 g and 1200 g, respectively.

Here, 1.18 mol of the compound (modifier (4)) containing a nitrogen atom and/or a silicon atom was introduced per mol of the alkali metal derived from the polymerization initiator introduced.

<Synthesis of Copolymer (4)> n-Hexane (18 L), styrene (300 g), butadiene (1450 g), and THF (40 mmol) were charged into a sufficiently nitrogen-purged 30-L pressure-resistant container, and heated to 70° C. After further addition of the initiator (1) (34 mL), the mixture was heated to 50° C., and stirred for 3 hours. Next, the modifier (4) (40 mL) was added, followed by stirring for 30 minutes. The reaction solution was mixed with methanol (15 mL) and 2,6-tert-butyl-p-cresol (0.1 g). Thereafter, a coagulum was recovered from the polymer solution by steam stripping treatment, and the coagulum was dried under reduced pressure for 24 hours to give a copolymer (4).

Here, 1.18 mol of the compound (modifier (4)) containing a nitrogen atom and/or a silicon atom was introduced per mol of the alkali metal derived from the polymerization initiator introduced.

<Synthesis of Copolymer (5)> n-Hexane (18 L), styrene (300 g), butadiene (1450 g), and THF (40 mmol) were charged into a sufficiently nitrogen-purged 30-L pressure-resistant container, and heated to 30° C. After further addition of the initiator (1) (34 mL), the mixture was heated to 50° C., and stirred for 3 hours. Next, the modifier (4) (40 mL) was added, followed by stirring for 30 minutes. The reaction solution was mixed with methanol (15 mL) and 2,6-tert-butyl-p-cresol (0.1 g). Thereafter, a coagulum was recovered from the polymer solution by steam stripping treatment, and the coagulum was dried under reduced pressure for 24 hours to give a copolymer (5).

Here, 1.18 mol of the compound (modifier (4)) containing a nitrogen atom and/or a silicon atom was introduced per mol of the alkali metal derived from the polymerization initiator introduced.

<Synthesis of Copolymer (6)>

A copolymer (6) was produced based on the same formulation as that for the synthesis of the copolymer (1), except that the amounts of styrene and butadiene were changed to 420 g and 1580 g, respectively.

Here, 1.18 mol of the compound (modifier (4)) containing a nitrogen atom and/or a silicon atom was introduced per mol of the alkali metal derived from the polymerization initiator introduced.

<Synthesis of Copolymer (7)> n-Hexane (18 L), styrene (300 g), butadiene (1700 g), the modifier (1) (40 mL), and TMEDA (10 mmol) were charged into a sufficiently nitrogen-purged 30-L pressure-resistant container, and heated to 40° C. After further addition of the initiator (2) (34 mL), the mixture was heated to 50° C., and stirred for 3 hours. Next, the modifier (2) (20 mL) was added, followed by stirring for 30 minutes. The reaction solution was mixed with methanol (15 mL) and 2,6-tert-butyl-p-cresol (0.1 g). Thereafter, a coagulum was recovered from the polymer solution by steam stripping treatment, and the coagulum was dried under reduced pressure for 24 hours to give a copolymer (7).

Here, 0.32 g of the silicon-containing vinyl compound (modifier (1)) was introduced for each 100 g of the monomer component; 0.85 mmol of the polymerization initiator (initiator (2)) was introduced for each 100 g of the monomer component; and 1.18 mol of the compound (modifier (2)) containing a nitrogen atom and/or a silicon atom was introduced per mol of the alkali metal derived from the polymerization initiator introduced.

<Synthesis of Copolymer (8)>

A copolymer (8) was produced based on the same formulation as that for the synthesis of the copolymer (7), except that the modifier (3) was used instead of the modifier (1).

Here, 0.43 g of the silicon-containing vinyl compound (modifier (3)) was introduced for each 100 g of the monomer component; 0.85 mmol of the polymerization initiator (initiator (2)) was introduced for each 100 g of the monomer component; and 1.18 mol of the compound (modifier (2)) containing a nitrogen atom and/or a silicon atom was introduced per mol of the alkali metal derived from the polymerization initiator introduced.

<Synthesis of Copolymer (9)>

A copolymer (9) was produced based on the same formulation as that for the synthesis of the copolymer (7), except that the modifier (4) was used instead of the modifier (2).

Here, 0.32 g of the silicon-containing vinyl compound (modifier (1)) was introduced for each 100 g of the monomer component; 0.85 mmol of the polymerization initiator (initiator (2)) was introduced for each 100 g of the monomer component; and 1.18 mol of the compound (modifier (4)) containing a nitrogen atom and/or a silicon atom was introduced per mol of the alkali metal derived from the polymerization initiator introduced.

<Synthesis of Copolymer (10)>

A copolymer (10) was produced based on the same formulation as that for the synthesis of the copolymer (8), except that the modifier (4) was used instead of the modifier (2).

Here, 0.43 g of the silicon-containing vinyl compound (modifier (3)) was introduced for each 100 g of the monomer component; 0.85 mmol of the polymerization initiator (initiator (2)) was introduced for each 100 g of the monomer component; and 1.18 mol of the compound (modifier (4)) containing a nitrogen atom and/or a silicon atom was introduced per mol of the alkali metal derived from the polymerization initiator introduced.

<Synthesis of Copolymer (11)>

A copolymer (11) was produced based on the same formulation as that for the synthesis of the copolymer (7), except that the amounts of styrene and butadiene were changed to 420 g and 1580 g, respectively.

Here, 0.32 g of the silicon-containing vinyl compound (modifier (1)) was introduced for each 100 g of the monomer component; 0.85 mmol of the polymerization initiator (initiator (2)) was introduced for each 100 g of the monomer component; and 1.18 mol of the compound (modifier (2))

<Synthesis of Copolymer (12)>

A copolymer (12) was produced based on the same formulation as that for the synthesis of the copolymer (9), except that the amounts of styrene and butadiene were changed to 420 g and 1580 g, respectively.

Here, 0.32 g of the silicon-containing vinyl compound (modifier (1)) was introduced for each 100 g of the monomer component; 0.85 mmol of the polymerization initiator (initiator (2)) was introduced for each 100 g of the monomer component; and 1.18 mol of the compound (modifier (4)) containing a nitrogen atom and/or a silicon atom was introduced per mol of the alkali metal derived from the polymerization initiator introduced.

<Synthesis of Copolymer (13)>

A copolymer (13) was produced based on the same formulation as that for the synthesis of the copolymer (7), except that the modifier (5) was used instead of the modifier (2).

Here, 0.32 g of the silicon-containing vinyl compound (modifier (1)) was introduced for each 100 g of the monomer component; 0.85 mmol of the polymerization initiator (initiator (2)) was introduced for each 100 g of the monomer component; and 1.18 mol of the compound (modifier (5)) containing a nitrogen atom and/or a silicon atom was introduced per mol of the alkali metal derived from the polymerization initiator introduced.

<Synthesis of Copolymer (14)>

A copolymer (14) was produced based on the same formulation as that for the synthesis of the copolymer (8), except that the modifier (5) was used instead of the modifier (2).

Here, 0.43 g of the silicon-containing vinyl compound (modifier (3)) was introduced for each 100 g of the monomer component; 0.85 mmol of the polymerization initiator (initiator (2)) was introduced for each 100 g of the monomer component; and 1.18 mol of the compound (modifier (5)) containing a nitrogen atom and/or a silicon atom was introduced per mol of the alkali metal derived from the polymerization initiator introduced.

<Synthesis of Copolymer (15)>

A copolymer (15) was produced based on the same formulation as that for the synthesis of the copolymer (7), except that the modifier (6) was used instead of the modifier (2).

Here, 0.32 g of the silicon-containing vinyl compound (modifier (1)) was introduced for each 100 g of the monomer component; 0.85 mmol of the polymerization initiator (initiator (2)) was introduced for each 100 g of the monomer component; and 1.18 mol of the compound (modifier (6)) containing a nitrogen atom and/or a silicon atom was introduced per mol of the alkali metal derived from the polymerization initiator introduced.

<Synthesis of Copolymer (16)>

A copolymer (16) was produced based on the same formulation as that for the synthesis of the copolymer (8), except that the modifier (6) was used instead of the modifier (2).

Here, 0.43 g of the silicon-containing vinyl compound (modifier (3)) was introduced for each 100 g of the monomer component; 0.85 mmol of the polymerization initiator (initiator (2)) was introduced for each 100 g of the monomer component; and 1.18 mol of the compound (modifier (6)) containing a nitrogen atom and/or a silicon atom was introduced per mol of the alkali metal derived from the polymerization initiator introduced.

<Synthesis of Copolymer (17)>

A copolymer (17) was produced based on the same formulation as that for the synthesis of the copolymer (7), except that the modifier (7) was used instead of the modifier (2).

Here, 0.32 g of the silicon-containing vinyl compound (modifier (1)) was introduced for each 100 g of the monomer component; 0.85 mmol of the polymerization initiator (initiator (2)) was introduced for each 100 g of the monomer component; and 1.18 mol of the compound (modifier (7)) containing a nitrogen atom and/or a silicon atom was introduced per mol of the alkali metal derived from the polymerization initiator introduced.

<Synthesis of Copolymer (18)>

A copolymer (18) was produced based on the same formulation as that for the synthesis of the copolymer (8), except that the modifier (7) was used instead of the modifier (2).

Here, 0.43 g of the silicon-containing vinyl compound (modifier (3)) was introduced for each 100 g of the monomer component; 0.85 mmol of the polymerization initiator (initiator (2)) was introduced for each 100 g of the monomer component; and 1.18 mol of the compound (modifier (7)) containing a nitrogen atom and/or a silicon atom was introduced per mol of the alkali metal derived from the polymerization initiator introduced.

<Synthesis of Low Molecular Weight Copolymer (1)> n-Hexane (18 L), styrene (550 g), butadiene (1450 g), and TMEDA (550 mmol) were charged into a sufficiently nitrogen-purged 30-L pressure-resistant container to prepare a mixture. After further drop-wise addition of the initiator (1) (1300 mL) over 1 hour, the mixture was heated to 30° C., and stirred for 3 hours. To the reaction solution were added methanol (15 mL) and 2,6-tert-butyl-p-cresol (0.1 g), and then the polymerization solution was mixed with water (18 L), followed by stirring for 2 hours. The resulting solution was left for 24 hours. A coagulum in a separated upper layer was collected and dried under reduced pressure for 24 hours to give a low molecular weight copolymer (1).

<Synthesis of Low Molecular Weight Copolymer (2)>

A low molecular weight copolymer (2) was produced based on the same formulation as that for the synthesis of the low molecular weight copolymer (1), except that the amounts of styrene and butadiene were changed to 550 g and 1450 g, respectively.

<Synthesis of Low Molecular Weight Copolymer (3)>

A low molecular weight copolymer (3) was produced based on the same formulation as that for the synthesis of the low molecular weight copolymer (1), except that the amounts of styrene and butadiene were changed to 800 g and 1200 g, respectively.

<Synthesis of Low Molecular Weight Copolymer (4)>

A low molecular weight copolymer (4) was produced based on the same formulation as that for the synthesis of the low molecular weight copolymer (3), except that the TMEDA and the initiator (1) were used in an amount of 130 mmol and 380 mL, respectively.

Table 1 summarizes the monomer components and others of the copolymers (1) to (18) and the low molecular weight copolymers (1) to (4).

TABLE 1

| Copolymer | Initiator | Monomer component | Terminal modifier | Styrene content (% by mass) | Vinyl bond content (mol %) | Glass transition temperature (° C.) | Molecular weight distribution Mw/Mn | Molecular weight Mw (unit: ten thansand) |
|---|---|---|---|---|---|---|---|---|
| Copolymer (1) | Initiator (1) | Styrene, 1,3-Butadiene | Modifier (4) | 28 | 56 | −27 | 1.14 | 27.1 |
| Copolymer (2) | Initiator (1) | Styrene, 1,3-Butadiene | Modifier (4) | 14 | 56 | −50 | 1.13 | 25.6 |
| Copolymer (3) | Initiator (1) | Styrene, 1,3-Butadiene | Modifier (4) | 40 | 58 | −12 | 1.15 | 27.8 |
| Copolymer (4) | Initiator (1) | Styrene, 1,3-Butadiene | Modifier (4) | 14 | 23 | −63 | 1.19 | 25.1 |
| Copolymer (5) | Initiator (1) | Styrene, 1,3-Butadiene | Modifier (4) | 14 | 41 | −56 | 1.18 | 26.2 |
| Copolymer (6) | Initiator (1) | Styrene, 1,3-Butadiene | Modifier (4) | 21 | 56 | −28 | 1.14 | 27.1 |
| Copolymer (7) | Initiator (2) | Styrene, 1,3-Butadiene, Modifier (1) | Modifier (2) | 14 | 56 | −48 | 1.13 | 24.8 |
| Copolymer (8) | Initiator (2) | Styrene, 1,3-Butadiene, Modifier (3) | Modifier (2) | 14 | 56 | −49 | 1.18 | 26.0 |
| Copolymer (9) | Initiator (2) | Styrene, 1,3-Butadiene, Modifier (1) | Modifier (4) | 14 | 56 | −48 | 1.19 | 27.2 |
| Copolymer (10) | Initiator (2) | Styrene, 1,3-Butadiene, Modifier (3) | Modifier (4) | 14 | 56 | −47 | 1.20 | 25.8 |
| Copolymer (11) | Initiator (2) | Styrene, 1,3-Butadiene, Modifier (1) | Modifier (2) | 21 | 56 | −27 | 1.13 | 26.7 |
| Copolymer (12) | Initiator (2) | Styrene, 1,3-Butadiene, Modifier (1) | Modifier (4) | 21 | 56 | −28 | 1.19 | 27.2 |
| Copolymer (13) | Initiator (2) | Styrene, 1,3-Butadiene, Modifier (1) | Modifier (5) | 14 | 56 | −48 | 1.18 | 26.7 |
| Copolymer (14) | Initiator (2) | Styrene, 1,3-Butadiene, Modifier (3) | Modifier (5) | 14 | 56 | −48 | 1.19 | 27.4 |
| Copolymer (15) | Initiator (2) | Styrene, 1,3-Butadiene, Modifier (1) | Modifier (6) | 14 | 56 | −49 | 1.19 | 27.5 |
| Copolymer (16) | Initiator (2) | Styrene, 1,3-Butadiene, Modifier (3) | Modifier (6) | 14 | 56 | −48 | 1.22 | 28.0 |
| Copolymer (17) | Initiator (2) | Styrene, 1,3-Butadiene, Modifier (1) | Modifier (7) | 14 | 56 | −47 | 1.21 | 27.3 |
| Copolymer (18) | Initiator (2) | Styrene, 1,3-Butadiene, Modifier (3) | Modifier (7) | 14 | 56 | −48 | 1.20 | 28.1 |
| Low molecular weight copolymer (1) | Initiator (1) | Styrene, 1,3-Butadiene | Not added | 14 | 52 | −52 | 1.13 | 0.45 |
| Low molecular weight copolymer (2) | Initiator (1) | Styrene, 1,3-Butadiene | Not added | 28 | 53 | −28 | 1.14 | 0.45 |
| Low molecular weight copolymer (3) | Initiator (1) | Styrene, 1,3-Butadiene | Not added | 40 | 51 | −14 | 1.15 | 0.45 |
| Low molecular weight copolymer (4) | Initiator (1) | Styrene, 1,3-Butadiene | Not added | 40 | 56 | −12 | 1.15 | 2.1 |

The following describes the chemicals used in the examples and comparative examples.
Copolymers (1) to (18): synthesized as above
Low molecular weight copolymers (1) to (4): synthesized as above
Polybutadiene rubber: Ubepol BR150B (glass transition temperature: −110° C.) produced by Ube Industries, Ltd.
Silica: ULTRASIL VN3 ($N_2SA$: 175 $m^2/g$) produced by Evonik Degussa
Silane coupling agent: Si69 (bis(3-triethoxysilylpropyl)tetrasulfide) produced by Evonik Degussa
Carbon black: Diablack N339 ($N_2SA$: 96 $m^2/g$, DBP absorption: 124 mL/100 g) produced by Mitsubishi Chemical Corporation
Aromatic oil: X-140 produced by JX Nippon Oil & Energy Corporation
Mineral oil: PS-32 (paraffinic process oil) produced by Idemitsu Kosan Co., Ltd
Antioxidant: Antigene 3C produced by Sumitomo Chemical Co., Ltd.
Stearic acid: TSUBAKI stearic acid beads produced by NOF Corporation
Zinc oxide: Zinc oxide #1 produced by Mitsui Mining & Smelting Co., Ltd.
Wax: Sunnoc N produced by Ouchi Shinko Chemical Industrial Co., Ltd.
Sulfur: sulfur powder produced by Tsurumi Chemical Industry Co., Ltd.
Vulcanization accelerator 1: Soxinol CZ produced by Sumitomo Chemical Co., Ltd.
Vulcanization accelerator 2: Soxinol D produced by Sumitomo Chemical Co., Ltd.

Examples and Comparative Examples

According to each of the formulations shown in Tables 2 to 4, the materials other than the sulfur and vulcanization accelerators were kneaded for 5 minutes at 150° C. using a 1.7-L Banbury mixer (produced by Kobe Steel, Ltd.) to give a kneadate. The sulfur and vulcanization accelerators were then added to the kneadate, followed by kneading for 5 minutes at 80° C. using an open roll mill to give an unvulcanized rubber composition. The unvulcanized rubber composition was press-vulcanized for 20 minutes at 170° C. in a 0.5 mm-thick mold to obtain a vulcanized rubber composition.

Separately, the unvulcanized rubber composition was formed into a tread shape and assembled with other tire components on a tire building machine to build an unvulcanized tire. The unvulcanized tire was vulcanized for 12 minutes at 170° C. to prepare a test tire (size: 195/65R15).
<Evaluation Items and Test Methods>
<Tan δ Peak Temperature>
The tan δ of each vulcanized rubber composition was measured at a dynamic strain amplitude of 1%, a frequency of 10 Hz, a rate of temperature rise of 2° C./min. over a measurement temperature range from −80 to 80° C. using a spectrometer (produced by Ueshima Seisakusho Co., Ltd.). The temperature at which tan δ reached its peak was determined as a tan δ peak temperature.

<Kneading Processability Index>

The Mooney viscosity ($ML_{1+4}$/130° C.) of each unvulcanized rubber composition was determined in accordance with JIS K6300-1:2001 "Rubber, unvulcanized—Physical property—Part 1: Determination of Mooney viscosity and prevulcanization characteristics with Mooney viscometer" using a Mooney viscosity tester. That is, under a temperature condition of 130° C. achieved by 1 minute pre-heating, the Mooney viscosity of the unvulcanized rubber composition was measured after a small rotor was rotated for 4 minutes. The result is expressed as an index. A higher index indicates a lower Mooney viscosity, which in turn indicates better kneading processability. The index was calculated according to the following equation.

(Kneading processability index)=(Mooney viscosity of Comparative Example 1)/(Mooney viscosity of each formulation)×100

<Low-Heat-Build-Up Index>

The tan δ of each vulcanized rubber composition was measured at a dynamic strain amplitude of 1%, a frequency of 10 Hz, and a temperature of 50° C. using a spectrometer (produced by Ueshima Seisakusho Co., Ltd.). The reciprocal of the tan δ value is expressed as an index relative to that of Comparative Example 1 (=100). A higher index indicates a smaller rolling resistance (less heat build-up), which in turn indicates better fuel economy.

<Rubber Strength Index>

Each sample was subjected to a tensile test in accordance with JIS K 6251:2010 to measure the elongation at break. The measurement result is expressed as an index relative to that of Comparative Example 1 (=100). A higher index indicates higher rubber strength (tensile strength at break).

(Rubber strength index)=(Elongation at break of each formulation)/(Elongation at break of Comparative Example 1)×100

<Wet-Grip Performance Index>

The test tires of each example were mounted on all the wheels of a vehicle (front-engine, front-wheel drive (FF) vehicle, 2000 cc, made in Japan). The braking distance from an initial speed of 100 km/h was determined on a wet asphalt road. The result is expressed as an index. A higher index indicates better wet-skid performance (wet-grip performance). The index was calculated according to the following equation.

(Wet-grip performance index)=(Braking distance in Comparative Example 1)/(Braking distance of each formulation)×100

<Wet-Grip Temperature Dependence Index>

The test tires of each example were mounted on all the wheels of a vehicle (front-engine, front-wheel drive (FF) vehicle, 2000 cc, made in Japan). The braking distance (breaking distance A) from an initial speed of 100 km/h on a wet asphalt road at a road surface temperature of 25° C. was determined. Similarly, the braking distance (breaking distance B) from an initial speed of 100 km/h on a wet asphalt road at a road surface temperature of 15° C. was determined. The ratio between the breaking distance A and the breaking distance B was determined as an index of wet-grip temperature dependence. A higher index indicates a smaller temperature dependence of wet-grip performance, and is thus better.

(Wet-grip temperature dependence index)=[(Braking distance B in Comparative Example 1)/(Braking distance A in Comparative Example 1)]/[(Braking distance B of each formulation)/(Braking distance A of each formulation)]×100

<Abrasion Resistance Index>

The volume loss of each vulcanized rubber composition was measured with a laboratory abrasion and skid tester (LAT tester) at a load of 50 N, a speed of 20 km/h, and a slip angle of 5 degrees. The values (abrasion resistance indices) in Tables 2 to 4 are relative to the volume loss of Comparative Example 1 (=100). A higher index indicates better abrasion resistance.

<Handling Stability>

The test tires of each example were mounted on all the wheels of a front-engine, front-wheel drive (FF) vehicle (2000 cc, made in Japan), and the vehicle was driven on a test track (dry road surface). The handling stability was evaluated based on sensory evaluation by a driver. The evaluation was made on a scale of 1 to 10, with 10 being the highest rating. Ratings are relative to Comparative Example 1, which was given a rating of 6. A higher rating indicates better handling stability.

TABLE 2

| | | Styrene content (% by mass) | Vinyl content (mol %) | Comparative Example | | | | | | Example | | | | | | |
|---|---|---|---|---|---|---|---|---|---|---|---|---|---|---|---|---|
| | | | | 1 | 2 | 3 | 4 | 5 | 6 | 1 | 2 | 3 | 4 | 5 | 6 | 7 |
| Formulation (part(s) by mass) | Copolymer (1) | 28 | 56 | — | 90 | 60 | 30 | 80 | 60 | 70 | 60 | 40 | 45 | 30 | 45 | 45 |
| | Copolymer (2) | 14 | 56 | — | — | 30 | 70 | 20 | 40 | 30 | 40 | 60 | 40 | 40 | — | — |
| | Copolymer (3) | 40 | 58 | — | — | — | — | — | — | — | — | — | 15 | 30 | 15 | 15 |
| | Copolymer (4) | 14 | 23 | — | — | — | — | — | — | — | — | — | — | — | 40 | — |
| | Copolymer (5) | 14 | 41 | — | — | — | — | — | — | — | — | — | — | — | — | 40 |
| | Copolymer (6) | 21 | 56 | 100 | — | — | — | — | — | — | — | — | — | — | — | — |
| | Copolymer (7) | 14 | 56 | — | — | — | — | — | — | — | — | — | — | — | — | — |
| | Copolymer (8) | 14 | 56 | — | — | — | — | — | — | — | — | — | — | — | — | — |
| | Copolymer (9) | 14 | 56 | — | — | — | — | — | — | — | — | — | — | — | — | — |
| | Copolymer (10) | 14 | 56 | — | — | — | — | — | — | — | — | — | — | — | — | — |
| | Copolymer (11) | 21 | 56 | — | — | — | — | — | — | — | — | — | — | — | — | — |
| | Copolymer (12) | 21 | 56 | — | — | — | — | — | — | — | — | — | — | — | — | — |
| | Low molecular weight copolymer (1) | 14 | 52 | 5 | 5 | 5 | 5 | 5 | 5 | 5 | 5 | 5 | 5 | 5 | 5 | 5 |

TABLE 2-continued

|  |  | Styrene content (% by mass) | Vinyl content (mol %) | Comparative Example |  |  |  |  |  | Example |  |  |  |  |  |  |
|---|---|---|---|---|---|---|---|---|---|---|---|---|---|---|---|---|
|  |  |  |  | 1 | 2 | 3 | 4 | 5 | 6 | 1 | 2 | 3 | 4 | 5 | 6 | 7 |
|  | Low molecular weight copolymer (2) | 28 | 53 | — | — | — | — | — | — | — | — | — | — | — | — | — |
|  | Low molecular weight copolymer (3) | 40 | 51 | — | — | — | — | — | — | — | — | — | — | — | — | — |
|  | Low molecular weight copolymer (4) | 40 | 56 | — | — | — | — | — | — | — | — | — | — | — | — | — |
|  | Polybutadiene rubber |  |  | — | 10 | 10 | — | — | — | — | — | — | — | — | — | — |
|  | Silica (N$_2$SA: 175 m$^2$/g) |  |  | 75 | 75 | 75 | 75 | 75 | 75 | 75 | 75 | 75 | 75 | 75 | 75 | 75 |
|  | Silane coupling agent |  |  | 6 | 6 | 6 | 6 | 6 | 6 | 6 | 6 | 6 | 6 | 6 | 6 | 6 |
|  | Carbon black |  |  | 15 | 15 | 15 | 15 | 15 | 15 | 15 | 15 | 15 | 15 | 15 | 15 | 15 |
|  | Aromatic oil |  |  | 20 | 20 | 20 | 20 | 12 | 10 | 15 | 20 | 20 | 15 | 13 | 17 | 20 |
|  | Mineral oil |  |  | — | — | — | — | 8 | 10 | 5 | — | — | 5 | 10 | 3 | — |
|  | Antioxidant |  |  | 1.5 | 1.5 | 1.5 | 1.5 | 1.5 | 1.5 | 1.5 | 1.5 | 1.5 | 1.5 | 1.5 | 1.5 | 1.5 |
|  | Stearic acid |  |  | 2 | 2 | 2 | 2 | 2 | 2 | 2 | 2 | 2 | 2 | 2 | 2 | 2 |
|  | Zinc oxide |  |  | 2.5 | 2.5 | 2.5 | 2.5 | 2.5 | 2.5 | 2.5 | 2.5 | 2.5 | 2.5 | 2.5 | 2.5 | 2.5 |
|  | Wax |  |  | 1 | 1 | 1 | 1 | 1 | 1 | 1 | 1 | 1 | 1 | 1 | 1 | 1 |
|  | Sulfur |  |  | 2 | 2 | 2 | 2 | 2 | 2 | 2 | 2 | 2 | 2 | 2 | 2 | 2 |
|  | Vulcanization accelerator 1 |  |  | 1.8 | 1.8 | 1.8 | 1.8 | 1.8 | 1.8 | 1.8 | 1.8 | 1.8 | 1.8 | 1.8 | 1.8 | 1.8 |
|  | Vulcanization accelerator 2 |  |  | 1.2 | 1.2 | 1.2 | 1.2 | 1.2 | 1.2 | 1.2 | 1.2 | 1.2 | 1.2 | 1.2 | 1.2 | 1.2 |
| Evaluation | tan δ peak temperature |  |  | −17 | −18 | −19 | −22 | −17 | −24 | −17 | −17 | −20 | −17 | −16 | −18 | −18 |
|  | Kneading processability index |  |  | 100 | 104 | 103 | 99 | 102 | 106 | 105 | 102 | 101 | 102 | 100 | 102 | 102 |
|  | Low-heat-build-up index |  |  | 100 | 102 | 102 | 99 | 94 | 105 | 98 | 100 | 102 | 98 | 95 | 90 | 98 |
|  | Rubber strength index |  |  | 100 | 95 | 97 | 100 | 102 | 92 | 101 | 105 | 103 | 105 | 107 | 103 | 105 |
|  | Wet-grip performance index |  |  | 100 | 93 | 94 | 97 | 106 | 90 | 105 | 105 | 100 | 110 | 115 | 110 | 110 |
|  | Wet-grip temperature dependence index |  |  | 100 | 102 | 106 | 107 | 105 | 108 | 108 | 108 | 107 | 115 | 120 | 112 | 115 |
|  | Abrasion resistance index |  |  | 100 | 110 | 112 | 115 | 105 | 97 | 106 | 112 | 115 | 114 | 117 | 110 | 106 |
|  | Handling stability |  |  | 6 | 6 | 6 | 6 | 6.3 | 5.75 | 6.3 | 6.3 | 6 | 6.3 | 6.50 | 6.3 | 6.3 |

TABLE 3

|  |  | Styrene content (% by mass) | Vinyl content (mol %) | Com. Ex. 7 | Ex. 2 | Com. Ex. 8 | Ex. 9 | Com. Ex. 8 | Ex. 10 | Ex. 11 | Com. Ex. 12 | Ex. 9 | Ex. 13 | Ex. 14 | Com. Ex. 10 | Ex. 15 | Ex. 16 |
|---|---|---|---|---|---|---|---|---|---|---|---|---|---|---|---|---|---|
| Form-ulation (part(s) by mass) | Copolymer (1) | 28 | 56 | 60 | 60 | 60 | 60 | 60 | 60 | 60 | 60 | — | 60 | 60 | — | 60 | 60 |
|  | Copolymer (2) | 14 | 56 | 40 | 40 | 40 | 40 | 40 | 40 | 40 | 40 | — | — | — | — | — | — |
|  | Copolymer (3) | 40 | 58 | — | — | — | — | — | — | — | — | — | — | — | — | — | — |
|  | Copolymer (4) | 14 | 23 | — | — | — | — | — | — | — | — | — | — | — | — | — | — |
|  | Copolymer (5) | 14 | 41 | — | — | — | — | — | — | — | — | — | — | — | — | — | — |
|  | Copolymer (6) | 21 | 56 | — | — | — | — | — | — | — | — | — | — | — | — | — | — |
|  | Copolymer (7) | 14 | 56 | — | — | — | — | — | — | — | — | — | 40 | — | — | — | — |
|  | Copolymer (8) | 14 | 56 | — | — | — | — | — | — | — | — | — | — | 40 | — | — | — |
|  | Copolymer (9) | 14 | 56 | — | — | — | — | — | — | — | — | — | — | — | — | 40 | — |
|  | Copolymer (10) | 14 | 56 | — | — | — | — | — | — | — | — | — | — | — | — | — | 40 |
|  | Copolymer (11) | 21 | 56 | — | — | — | — | — | — | — | — | 100 | — | — | — | — | — |
|  | Copolymer (12) | 21 | 56 | — | — | — | — | — | — | — | — | — | — | — | 100 | — | — |
|  | Low molecular weight copolymer (1) | 14 | 52 | — | 5 | 15 | 25 | 35 | — | — | — | 5 | 5 | 5 | 5 | 5 | 5 |
|  | Low molecular weight copolymer (2) | 28 | 53 | — | — | — | — | — | 5 | — | — | — | — | — | — | — | — |
|  | Low molecular weight copolymer (3) | 40 | 51 | — | — | — | — | — | — | 5 | — | — | — | — | — | — | — |
|  | Low molecular weight copolymer (4) | 40 | 56 | — | — | — | — | — | — | — | 5 | — | — | — | — | — | — |
|  | Polybutadiene rubber |  |  | — | — | — | — | — | — | — | — | — | — | — | — | — | — |
|  | Silica (N$_2$SA: 175 m$^2$/g) |  |  | 75 | 75 | 75 | 75 | 75 | 75 | 75 | 75 | 75 | 75 | 75 | 75 | 75 | 75 |
|  | Silane coupling agent |  |  | 6 | 6 | 6 | 6 | 6 | 6 | 6 | 6 | 6 | 6 | 6 | 6 | 6 | 6 |
|  | Carbon black |  |  | 15 | 15 | 15 | 15 | — | 15 | 15 | 15 | 15 | 15 | 15 | 15 | 15 | 15 |
|  | Aromatic oil |  |  | 25 | 20 | 10 | — | — | 20 | 20 | 20 | 20 | 20 | 20 | 20 | 20 | 20 |
|  | Mineral oil |  |  | — | — | — | — | — | — | — | — | — | — | — | — | — | — |
|  | Antioxidant |  |  | 1.5 | 1.5 | 1.5 | 1.5 | 1.5 | 1.5 | 1.5 | 1.5 | 1.5 | 1.5 | 1.5 | 1.5 | 1.5 | 1.5 |
|  | Stearic acid |  |  | 2 | 2 | 2 | 2 | 2 | 2 | 2 | 2 | 2 | 2 | 2 | 2 | 2 | 2 |
|  | Zinc oxide |  |  | 2.5 | 2.5 | 2.5 | 2.5 | 2.5 | 2.5 | 2.5 | 2.5 | 2.5 | 2.5 | 2.5 | 2.5 | 2.5 | 2.5 |

TABLE 3-continued

|  | Styrene content (% by mass) | Vinyl content (mol %) | Com. Ex. 7 | Ex. 2 | Com. Ex. 8 | Ex. 9 | Com. Ex. 8 | Ex. 10 | Ex. 11 | Ex. 12 | Com. Ex. 9 | Ex. 13 | Ex. 14 | Com. Ex. 10 | Ex. 15 | Ex. 16 |
|---|---|---|---|---|---|---|---|---|---|---|---|---|---|---|---|---|
| Wax |  |  | 1 | 1 | 1 | 1 | 1 | 1 | 1 | 1 | 1 | 1 | 1 | 1 | 1 | 1 |
| Sulfur |  |  | 2 | 2 | 2 | 2 | 2 | 2 | 2 | 2 | 2 | 2 | 2 | 2 | 2 | 2 |
| Vulcanization accelerator 1 |  |  | 1.8 | 1.8 | 1.8 | 1.8 | 1.8 | 1.8 | 1.8 | 1.8 | 1.8 | 1.8 | 1.8 | 1.8 | 1.8 | 1.8 |
| Vulcanization accelerator 2 |  |  | 1.2 | 1.2 | 1.2 | 1.2 | 1.2 | 1.2 | 1.2 | 1.2 | 1.2 | 1.2 | 1.2 | 1.2 | 1.2 | 1.2 |
| Evaluation tan δ peak temperature |  |  | −18 | −17 | −18 | −19 | −19 | −17 | −17 | −15 | −17 | −17 | −17 | −17 | −17 | −17 |
| Kneading processability index |  |  | 104 | 102 | 101 | 101 | 112 | 102 | 102 | 98 | 120 | 136 | 131 | 122 | 130 | 128 |
| Low-heat-build-up index |  |  | 102 | 100 | 98 | 96 | 80 | 98 | 95 | 92 | 134 | 126 | 130 | 125 | 122 | 126 |
| Rubber strength index |  |  | 100 | 105 | 107 | 105 | 102 | 105 | 106 | 107 | 110 | 123 | 116 | 109 | 122 | 115 |
| Wet-grip performance index |  |  | 100 | 105 | 107 | 108 | 105 | 114 | 122 | 115 | 105 | 108 | 111 | 104 | 105 | 107 |
| Wet-grip temperature dependence index |  |  | 104 | 108 | 115 | 116 | 112 | 112 | 118 | 108 | 97 | 108 | 110 | 98 | 108 | 109 |
| Abrasion resistance index |  |  | 98 | 112 | 114 | 115 | 103 | 113 | 120 | 110 | 105 | 115 | 110 | 103 | 112 | 110 |
| Handling stability |  |  | 6 | 6.3 | 6.5 | 6.5 | 5.5 | 6.3 | 6.3 | 6.3 | 6.3 | 6 | 6 | 6.3 | 6 | 6 |

TABLE 4

|  |  | Styrene content (% by mass) | Vinyl content (mol %) | Com. Ex. 1 | Ex. 17 | Ex. 18 | Ex. 19 | Ex. 20 | Ex. 21 | Ex. 22 |
|---|---|---|---|---|---|---|---|---|---|---|
| Formulation (part(s) by mass) | Copolymer (1) | 28 | 56 | — | 60 | 60 | 60 | 60 | 60 | 60 |
|  | Copolymer (6) | 21 | 56 | 100 | — | — | — | — | — | — |
|  | Copolymer (13) | 14 | 56 | — | 40 | — | — | — | — | — |
|  | Copolymer (14) | 14 | 56 | — | — | 40 | — | — | — | — |
|  | Copolymer (15) | 14 | 56 | — | — | — | 40 | — | — | — |
|  | Copolymer (16) | 14 | 56 | — | — | — | — | 40 | — | — |
|  | Copolymer (17) | 14 | 56 | — | — | — | — | — | 40 | — |
|  | Copolymer (18) | 14 | 56 | — | — | — | — | — | — | 40 |
|  | Low molecular weight copolymer (1) | 14 | 52 | 5 | 5 | 5 | 5 | 5 | 5 | 5 |
|  | Low molecular weight copolymer (2) | 28 | 53 | — | — | — | — | — | — | — |
|  | Low molecular weight copolymer (3) | 40 | 51 | — | — | — | — | — | — | — |
|  | Low molecular weight copolymer (4) | 40 | 56 | — | — | — | — | — | — | — |
|  | Polybutadiene rubber |  |  | — | — | — | — | — | — | — |
|  | Silica ($N_2SA$: 175 $m^2/g$) |  |  | 75 | 75 | 75 | 75 | 75 | 75 | 75 |
|  | Silane coupling agent |  |  | 6 | 6 | 6 | 6 | 6 | 6 | 6 |
|  | Carbon black |  |  | 15 | 15 | 15 | 15 | 15 | 15 | 15 |
|  | Aromatic oil |  |  | 20 | 20 | 20 | 20 | 20 | 20 | 20 |
|  | Mineral oil |  |  | — | — | — | — | — | — | — |
|  | Antioxidant |  |  | 1.5 | 1.5 | 1.5 | 1.5 | 1.5 | 1.5 | 1.5 |
|  | Stearic acid |  |  | 2 | 2 | 2 | 2 | 2 | 2 | 2 |
|  | Zinc oxide |  |  | 2.5 | 2.5 | 2.5 | 2.5 | 2.5 | 2.5 | 2.5 |
|  | Wax |  |  | 1 | 1 | 1 | 1 | 1 | 1 | 1 |
|  | Sulfur |  |  | 2 | 2 | 2 | 2 | 2 | 2 | 2 |
|  | Vulcanization accelerator 1 |  |  | 1.8 | 1.8 | 1.8 | 1.8 | 1.8 | 1.8 | 1.8 |
|  | Vulcanization accelerator 2 |  |  | 1.2 | 1.2 | 1.2 | 1.2 | 1.2 | 1.2 | 1.2 |
| Evaluation | tan δ peak temperature |  |  | −17 | −17 | −17 | −18 | −17 | −17 | −17 |
|  | Kneading processability index |  |  | 100 | 121 | 117 | 121 | 117 | 125 | 121 |
|  | Low-heat-build-up index |  |  | 100 | 103 | 106 | 100 | 103 | 107 | 110 |
|  | Rubber strength index |  |  | 100 | 118 | 115 | 119 | 115 | 120 | 114 |
|  | Wet-grip performance index |  |  | 100 | 108 | 111 | 110 | 113 | 100 | 103 |
|  | Wet-grip temperature dependence index |  |  | 100 | 107 | 109 | 108 | 108 | 108 | 109 |
|  | Abrasion resistance index |  |  | 100 | 117 | 115 | 116 | 111 | 121 | 115 |
|  | Handling stability |  |  | 6 | 6 | 6 | 6 | 6 | 6 | 6 |

As shown in Tables 2 to 4, the rubber compositions of the examples, each combining SBR (A) and SBR (B), a low molecular weight conjugated diene polymer and a silica, and having a tan δ peak temperature of not lower than −20° C., showed improvements in wet-grip performance, abrasion resistance, and handling stability while ensuring good fuel economy, and further exhibited good processability, rubber strength, and temperature dependence of wet-grip performance, as compared with the rubber composition of Comparative Example 1 in which SBR (B) alone was combined.

The invention claimed is:
1. A rubber composition comprising:
a rubber component including, based on 100% by mass of the rubber component:
5 to 65% by mass of styrene butadiene rubber (A) having a styrene content of 6 to 14% by mass and a vinyl bond content in a 1,3-butadiene moiety of 10 to 70 mol %;

20 to 75% by mass of styrene butadiene rubber (B) having a styrene content of 16 to 28% by mass and a vinyl bond content in a 1,3-butadiene moiety of 10 to 70 mol %; and 5 to 50% by mass of styrene butadiene rubber (C) having a styrene content of 32 to 40% by mass and a vinyl bond content in a 1,3-butadiene moiety of 10 to 70 mol %, the rubber composition further comprising, for each 100 parts by mass of the rubber component:

1 to 30 parts by mass of a low molecular weight conjugated diene polymer having a glass transition temperature of −75 to 0° C. and a weight average molecular weight (Mw) of at least $1.0 \times 10^3$ but less than $1.5 \times 10^5$; and 10 to 150 parts by mass of a silica having a nitrogen adsorption specific surface area of 40 to 400 m$^2$/g, wherein said rubber composition comprises not less than 95% by mass of high molecular weight conjugated diene polymers having a glass transition temperature of −75 to 0° C. and a weight average molecular weight (Mw) of $1.5 \times 10^5$ to $1.5 \times 10^6$, and wherein said rubber composition has a tan δ peak temperature of not lower than −20° C.

2. The rubber composition according to claim 1, wherein the low molecular weight conjugated diene polymer has a weight average molecular weight (Mw) of $1.0 \times 10^3$ to $5.0 \times 10^3$.

3. The rubber composition according to claim 1, wherein at least one of the styrene butadiene rubbers (A), (B), and (C) is obtained by polymerizing a monomer component including styrene, 1,3-butadiene, and a silicon-containing vinyl compound in the presence of a polymerization initiator represented by the following formula (I):

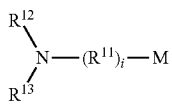

(I)

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom; and M represents an alkali metal atom, to produce a copolymer, and then reacting a compound containing at least one of a nitrogen atom and a silicon atom with an active terminal of the copolymer.

4. The rubber composition according to claim 3, wherein the styrene butadiene rubber (A) is obtained by polymerizing a monomer component including styrene, 1,3-butadiene, and a silicon-containing vinyl compound in the presence of a polymerization initiator represented by the formula (I) to produce a copolymer, and then reacting a compound containing at least one of a nitrogen atom and a silicon atom with an active terminal of the copolymer.

5. The rubber composition according to claim 3, wherein $R^{11}$ in the formula (I) is a group represented by the following formula (Ia):

(Ia)

wherein $R^{14}$ represents a hydrocarbylene group comprising at least one of a structural unit derived from a conjugated diene compound and a structural unit derived from an aromatic vinyl compound; and n represents an integer of 1 to 10.

6. The rubber composition according to claim 5, wherein $R^{14}$ in the formula (Ia) is a hydrocarbylene group comprising from one to ten isoprene-derived structural unit(s).

7. The rubber composition according to claim 3, wherein the silicon-containing vinyl compound is a compound represented by the following formula (II):

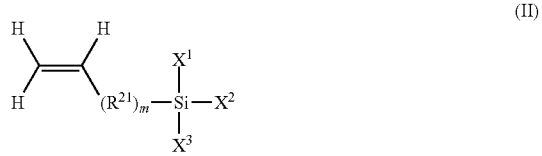

(II)

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

8. The rubber composition according to claim 1, wherein the low molecular weight conjugated diene polymer is a copolymer of styrene and 1,3-butadiene, and has a vinyl bond content in a 1,3-butadiene moiety of 20 to 70 mol %.

9. The rubber composition according to claim 1, wherein the low molecular weight conjugated diene polymer is a copolymer of styrene and 1,3-butadiene, and has a styrene content of 10 to 45% by mass.

10. A pneumatic tire, formed from the rubber composition according to claim 1.

* * * * *